United States Patent
Naito et al.

(10) Patent No.: US 9,335,538 B2
(45) Date of Patent: *May 10, 2016

(54) ELECTROWETTING DISPLAY DEVICE AND DYE COMPOSITION FOR ELECTROWETTING DISPLAY

(71) Applicant: FUJIFILM CORPORATION, Minato-ku, Tokyo (JP)

(72) Inventors: Hiroyuki Naito, Fujinomiya (JP); Yasuhiro Ishiwata, Fujinomiya (JP); Takashi Kato, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 472 days.

This patent is subject to a terminal disclaimer.

(21) Appl. No.: 13/898,477

(22) Filed: May 21, 2013

(65) Prior Publication Data
US 2013/0321895 A1 Dec. 5, 2013

(30) Foreign Application Priority Data
May 30, 2012 (JP) .................. 2012-123709

(51) Int. Cl.
*C09D 11/50* (2014.01)
*C09B 23/10* (2006.01)
(Continued)

(52) U.S. Cl.
CPC .................... *G02B 26/005* (2013.01)

(58) Field of Classification Search
CPC .. C09D 11/50; G02B 26/005; C09B 23/0008; C09B 23/0016; C09B 23/04; C09B 23/06; C09B 23/105
USPC ......... 106/31.27, 31.47, 31.49; 359/228, 290, 359/291, 292, 665, 666; 252/586
See application file for complete search history.

(56) References Cited

U.S. PATENT DOCUMENTS 7,800,816 B2 * 9/2010 Hayes .................. G02B 26/004
359/228
2009/0085909 A1 * 4/2009 Chen ..................... G09G 3/348
345/214
(Continued)

FOREIGN PATENT DOCUMENTS

JP 2009-86668 A 4/2009
JP 2011-095732 A 5/2011
(Continued)

OTHER PUBLICATIONS

English translation of JP 2013/014746; Jan. 2013; 58 pages.*
(Continued)

*Primary Examiner* — Helene Klemanski
(74) *Attorney, Agent, or Firm* — Solaris Intellectual Property Group, PLLC

(57) ABSTRACT

An electrowetting display device that includes a display member having: a first substrate in which at least one surface has conductivity, a second substrate which is disposed to face the conductive surface of the first substrate, a hydrophobic insulating film which is provided on the conductive surface of the first substrate, an oil, which is non-conductive, provided between the hydrophobic insulating film and the second substrate so as to be movable on the hydrophobic insulating film, and containing a nonpolar solvent and a methine dye including two dye mother nuclei that are linked through a linking group having a methine unsaturated chain, and a hydrophilic liquid which is conductive, provided between the hydrophobic insulating film and the second substrate so as to be in contact with the oil.

13 Claims, 1 Drawing Sheet

(51) Int. Cl.
 *C09B 23/04* (2006.01)
 *C09B 23/06* (2006.01)
 *G02B 26/00* (2006.01)

(56) References Cited

U.S. PATENT DOCUMENTS

| | | | | |
|---|---|---|---|---|
| 2010/0173134 A1* | 7/2010 | Khokhlov | ............ | H01L 51/442 428/174 |
| 2010/0220380 A1* | 9/2010 | Hayes | ................. | G02B 26/005 359/290 |
| 2012/0187351 A1* | 7/2012 | Ito | ........................... | C09B 23/04 252/586 |
| 2013/0301110 A1* | 11/2013 | Kato | .................... | G02B 26/005 359/290 |
| 2014/0078572 A1* | 3/2014 | Kato | ....................... | C09B 23/04 359/290 |
| 2014/0198374 A1* | 7/2014 | Fukushige | .............. | C09B 23/06 359/290 |
| 2014/0268299 A1* | 9/2014 | Kato | .................... | G02B 26/005 359/290 |
| 2014/0293394 A1* | 10/2014 | Kato | ....................... | C09B 23/04 359/290 |
| 2014/0320948 A1* | 10/2014 | Suzuki | ................. | G02B 26/005 359/290 |

FOREIGN PATENT DOCUMENTS

| | | | |
|---|---|---|---|
| JP | 2013/014746 | * | 1/2013 |
| WO | 2008/142086 A1 | | 11/2008 |
| WO | WO 2012/169445 A1 | * | 12/2012 |

OTHER PUBLICATIONS

Japanese Office Action issued Apr. 22, 2014, with the Partial English Translation.

* cited by examiner

ELECTROWETTING DISPLAY DEVICE AND DYE COMPOSITION FOR ELECTROWETTING DISPLAY

CROSS-REFERENCE TO RELATED APPLICATION

This application claims priority under 35 USC 119 from Japanese Patent Application No. 2012-123709 filed on May 30, 2012, the disclosure of which is incorporated by reference herein.

BACKGROUND OF THE INVENTION

1. Technical Field

The present invention relates to an electrowetting display device and a dye composition for an electrowetting display.

2. Background Art

Conventionally, research has been conducted related to an optical element that is equipped with a cell including two or more kinds of liquid that do not mix each other (for example, two liquids of oil and a hydrophilic liquid) and that acts (drives) by application of voltage. Examples of such an optical element include an optical shutter, a variable focal length lens, and an image display device.

In recent years, technology utilizing the electrowetting phenomenon has attracted particular attention.

As technology utilizing the electrowetting phenomenon, for example, an electrowetting display is known that includes: a first substrate and a second substrate which face each other; plural projections which are arranged to define plural pixel units; a non-conductive first fluid which is sealed in a pixel unit between two adjacent projections; and a second fluid which is a conductive or polar liquid immiscible with the first fluid (see, for example, Japanese Patent Application Laid-Open (JP-A) No. 2009-86668).

As the dye, many dyes are known and, for example, a methine dye having a methine group has been conventionally widely utilized (see, for example, International Publication WO 2008/142086). Further, as examples of the methine dye, a dipyrromethene dye and the like are known (see, for example, JP-A No. 2011-095732), and in such dyes, complex compounds obtained by coordination to a metal atom or a metal compound are also included.

SUMMARY OF INVENTION

According to an aspect of the invention, an electrowetting display device that includes a display member having: a first substrate in which at least a portion of at least one surface has conductivity, a second substrate which is disposed to face the conductive surface of the first substrate, a hydrophobic insulating film which is provided on at least a portion of conductive surface of the first substrate, an oil which is non-conductive, provided between the hydrophobic insulating film and the second substrate so as to be movable on the hydrophobic insulating film, and containing a nonpolar solvent and a methine dye including two dye mother nuclei that are linked through a linking group having a methine unsaturated chain, and a hydrophilic liquid which is conductive, provided between the hydrophobic insulating film and the second substrate so as to be in contact with the oil; wherein an image is displayed by applying a voltage between the hydrophilic liquid and the conductive surface of the first substrate and changing the shape of the interface between the oil and the hydrophilic liquid, and a dye composition for the electrowetting display device, which exhibits excellent responsiveness at the time of image display, and with which image disorder due to a back flow phenomenon is suppressed, are provided.

As described above, an electrowetting display is one of the display technologies that have recently attracted attention as a kind of image display medium, however, as a display medium alternative to a paper medium or the like, an electrowetting display is required to have various characteristics such as display speed when displaying an image, density, discrimination property, definition of the image displayed, and the like.

Among the various characteristics, the display speed (namely, the image forming property) and the discrimination property and definition of the image to be displayed are highly sought-after.

In order to efficiently realize the density of the image to be displayed in an electrowetting display, the density of oil that undergoes image formation, that is, the concentration of a coloring material contained in the oil, should be enhanced. In oil, a dye is generally used as the coloring material; however, there are cases in which dyes do not have good solubility with respect to a nonpolar solvent that constitutes the oil phase, and therefore it is difficult to enhance the concentration to a degree suitable for an image display, while maintaining high display characteristics.

Meanwhile, in a case in which a dye having a high solubility with respect to the nonpolar solvent is used, the color density itself of the oil may be increased; however, when the amount of dye is increased, the action sensitivity (responsiveness) of oil when a voltage is applied may be deteriorated, and the image forming property tends to be significantly damaged.

Accordingly, in order to maintain the image display property of a display to a certain extent, the image quality has to be lowered and a technique capable of realizing both the image display property (namely, the image forming property such as the display speed or the like) and the image quality has not been established yet.

The present invention has been made in view of the above problems and aims to accomplish the following. Namely, the object of the invention is to provide an electrowetting display device which exhibits excellent responsiveness at the time of image display, and with which image disorder due to a back flow phenomenon is suppressed, and a dye composition for an electrowetting display.

The present inventors have found the following and the present invention has been made based on this knowledge. Namely, it is advantageous that the coloring material included in an oil phase, which contributes to the formation of an image, has a high solubility with respect to the nonpolar solvent that forms the oil phase, from the viewpoint of enhancing display characteristics such as responsiveness and the like. An example of the dye is a methine dye that has a methine group in a molecule thereof. In particular, when the methine dye has a structure in which two dye mother nuclei are linked together by a methine unsaturated chain, the solubility may be enhanced and, as a result, the dye can be incorporated into the oil phase, and further, when the concentration of the dye is increased, the effect of improvement in responsiveness can be seen, and when kept in a state of voltage being applied, the back flow phenomenon may be suppressed.

"Back flow" is a phenomenon in which an area of oil, which has been reduced by shrinkage, gets larger with time, when kept in a state of voltage being applied.

Specific means for addressing the above problems are as follows.

<1> An electrowetting display device including a display member including: a first substrate in which at least a portion of at least one surface has conductivity, a second substrate which is disposed to face the conductive surface of the first substrate, a hydrophobic insulating film which is provided on at least a portion of the conductive surface of the first substrate, an oil, which is non-conductive, provided between the hydrophobic insulating film and the second substrate so as to be movable on the hydrophobic insulating film, and containing a nonpolar solvent and a methine dye including two dye mother nuclei that are linked through a linking group having a methine unsaturated chain, and a hydrophilic liquid which is conductive, provided between the hydrophobic insulating film and the second substrate so as to be in contact with the oil; wherein an image is displayed by changing the shape of the interface between the oil and the hydrophilic liquid by applying a voltage between the hydrophilic liquid and the conductive surface of the first substrate.

<2> The electrowetting display device according to the item <1>, wherein the methine dye does not include a metal atom or metallic compound for forming a complex.

<3> The electrowetting display device according to the item <1> or the item <2>, wherein solubility of the methine dye in n-hexane under a pressure of 0.1 MPa at a temperature of 25° C. is 1% by mass or greater.

<4> The electrowetting display device according to any one of the items <1> to <3>, wherein the methine dye is a dye represented by the following Formula (1):

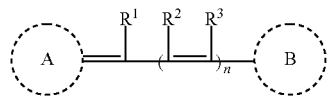

Formula (1)

wherein, in Formula (1), each of A and B independently represents a dye mother nucleus without a dissociative group; each of $R^1$, $R^2$ and $R^3$ independently represents a hydrogen atom, a halogen atom, an alkyl group, an aryl group or a heterocyclic group; and n represents an integer of 0, 1 or 2.

<5> The electrowetting display device according to any one of the items <1> to <4>, wherein the methine dye is represented by the following Formula (2):

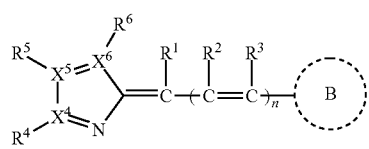

Formula (2)

wherein, in Formula (2), each of $R^1$, $R^2$, and $R^3$ independently represents a hydrogen atom, a halogen atom, an alkyl group, an aryl group or a heterocyclic group; each of $R^4$, $R^5$ and $R^6$ independently represents a hydrogen atom or a monovalent substituent; each of $X^4$, $X^5$, and $X^6$ independently represents a carbon atom or a nitrogen atom; when $X^4$, $X^5$ or $X^6$ represents a nitrogen atom, $R^4$, $R^5$ or $R^6$ respectively linked to $X^4$, $X^5$ or $X^6$ which represents a nitrogen atom, is not present; B represents a dye mother nucleus without a dissociative group; and n represents an integer of 0, 1 or 2.

<6> The electrowetting display device according to any one of the items <1> to <3>, wherein the methine dye is represented by the following Formula (3):

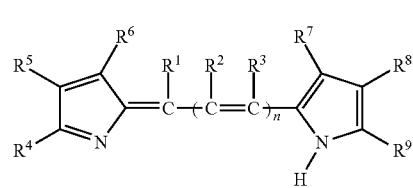

Formula (3)

wherein, in Formula (3), each of $R^1$, $R^2$, and $R^3$ independently represents a hydrogen atom, a halogen atom, an alkyl group, an aryl group or a heterocyclic group; each of $R^4$, $R^5$, $R^6$, $R^7$, $R^8$ and $R^9$ independently represents a hydrogen atom or a monovalent substituent; and n represents an integer of 0, 1 or 2.

<7> The electrowetting display device according to any one of the items <1> to <3>, wherein the methine dye is represented by the following Formula (4):

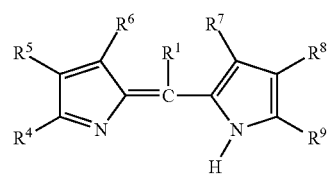

Formula (4)

wherein, in Formula (4), $R^1$ represents a hydrogen atom, a halogen atom, an alkyl group, an aryl group or a heterocyclic group; and each of $R^4$, $R^5$, $R^6$, $R^7$, $R^8$ and $R^9$ independently represents a hydrogen atom or a monovalent substituent.

<8> The electrowetting display device according to any one of the items <1> to <7>, wherein the methine dye includes a straight chain or branched alkyl group having 4 to 30 carbon atoms.

<9> The electrowetting display device according to any one of the items <1> to <8>, wherein a molecular weight of the methine dye is from 200 to less than 3000.

<10> The electrowetting display device according to any one of the items <1> to <9>, wherein a total amount of dyes contained in the oil is 20% by mass or more with respect to a total mass of the oil, and a ratio of the methine dye in the oil is 5% by mass or more with respect to a total mass of the oil.

<11> The electrowetting display device according to any one of the items <1> to <10>, wherein an amount of dissolved oxygen in the non-polar solvent is 10 ppm or less.

<12> The electrowetting display device according to any one of the items <1> to <11>, wherein the hydrophobic insulating film includes a crosslinked structure derived from a polyfunctional compound.

<13> A dye composition for an electrowetting display, the dye composition including a non-polar solvent and a methine dye that contains two dye mother nuclei linked through a linking group having a methine unsaturated chain.

<14> The dye composition for an electrowetting display according to the item <13>, wherein the methine dye includes a straight chain or branched alkyl group having 4 to 30 carbon atoms.

<15> The dye composition for an electrowetting display according to the item <13> or the item <14>, wherein a total amount of dyes contained in the oil is 20% by mass or more with respect to a total mass of the oil, and a ratio of the methine dye in the oil is 5% by mass or more with respect to a total mass of the oil.

DESCRIPTION OF EMBODIMENTS

Hereinafter, exemplary embodiments of the electrowetting display device are explained in detail with reference to the drawings, and through the explanation, the dye composition for an electrowetting display is also described in detail. However, it should be construed that the present invention is not limited to the following exemplary embodiments.

A first exemplary embodiment of the electrowetting display device of the present invention is described in detail with reference to FIG. 1 and FIG. 2. In the present exemplary embodiment, a glass substrate equipped with ITO is used as the first substrate having conductivity, decane is used as the nonpolar solvent that constitutes the oil, and an aqueous electrolyte solution is used as the hydrophilic liquid.

Figure 1:
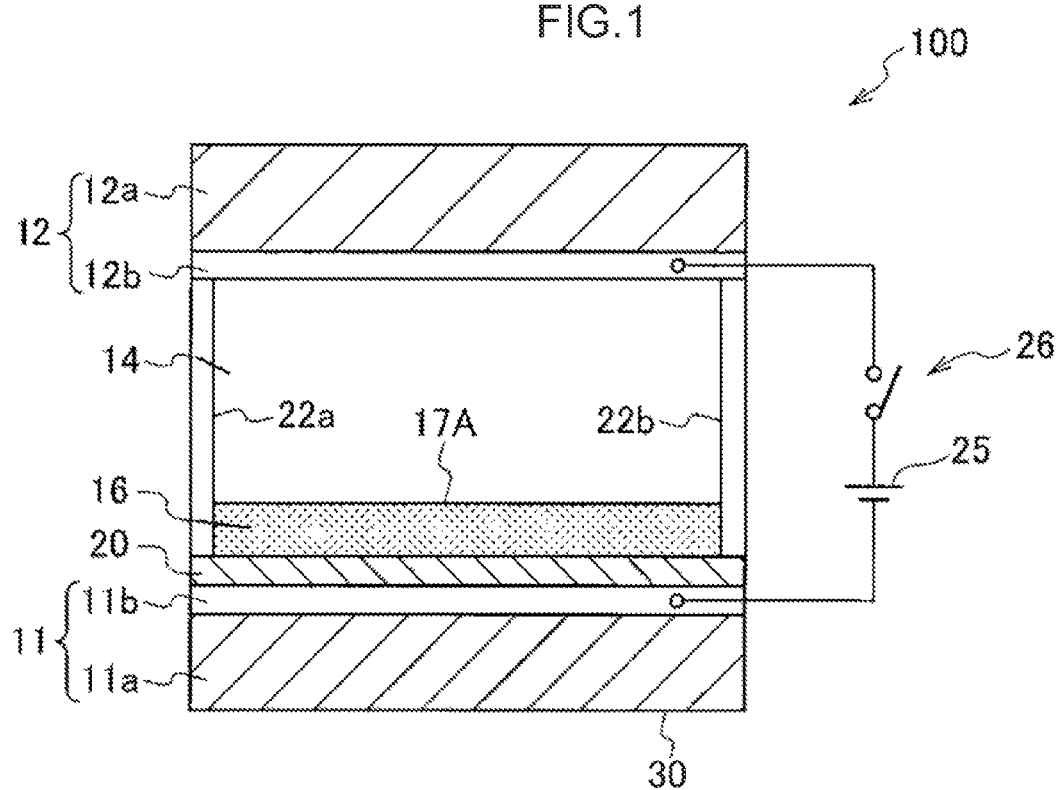
FIG. 1 is a schematic sectional view illustrating a state of voltage being not applied (voltage off state) of the electrowetting display device of an exemplary embodiment of the present invention.

As shown in FIG. 1, the electrowetting display device 100 of the present exemplary embodiment is equipped with substrate (first substrate) 11 having conductivity, substrate (second substrate) 12 which has conductivity and is arranged to face the substrate 11, hydrophobic insulating film 20 provided on the substrate 11, and hydrophilic liquid 14 and oil 16 which are filled in a region which is between the hydrophobic insulating film 20 and the substrate 12 and is divided by silicone rubber wall 22a and silicone rubber wall 22b. The region which is between the hydrophobic insulating film 20 and the substrate 12 and is divided by the silicone rubber wall 22a and the silicone rubber wall 22b is configured as a display member (display cell) that performs image display by the movement of the oil 16.

Conventionally, various investigations have been made concerning the electrowetting technology, and it is known that, when a solvent-soluble dye such as a dye or the like is included in the nonpolar solvent that forms the oil phase, the responsiveness at the time of image display tends to be deteriorated, and also the back flow when kept in a state of voltage being applied (voltage on state) tends to be deteriorated. These tendencies become more remarkable, in a case in which the color density is heightened in order to enhance the quality of the displayed image. For the dye component which is to be present in the oil phase, various dyes and the like can be used; however, above all, when a dye having a structure, in which two dye mother nuclei (coupler mother nuclei) each having a cyclic structure are linked together by a methine group, is used, the responsiveness or the back flow resistance characteristic in a voltage on state is less likely to be damaged. Accordingly, the present invention is characterized in that, particularly, by selectively using a methine dye, which includes two dye mother nuclei that are linked together by a linking group having a methine unsaturated chain, as the dye component which is used for coloring of the oil phase in the electrowetting technology, the responsiveness at the time of image display is peculiarly improved, and the back flow when brought to be in a voltage on state is peculiarly suppressed, while securing the dye solubility.

The substrate 11 has base material 11a and conductive film 11b which is provided on the base material 11a and has conductivity, and thus is configured such that the whole of the substrate surface exhibits conductivity. Further, substrate 12 is provided at the position facing the substrate 11. Similar to the substrate 11, the substrate 12 has base material 12a and conductive film 12b, which is provided on the base material 12a and has conductivity, and thus is configured such that the whole of the substrate surface exhibits conductivity. In the present exemplary embodiment, the substrate 11 and the substrate 12 are each constituted of a transparent glass substrate and a transparent ITO film provided on the glass substrate.

The base material 11a and the base material 12a may be formed by using either a transparent material or an opaque material, according to the display form of the device. From the viewpoint of displaying an image, it is preferable that at least one of the base material 11a or the base material 12a has light transmitting property. Specifically, it is preferable that at least one of the base material 11a or the substrate 12 has a transmission factor of 80% or higher (more preferably, 90% or higher) over the entire wavelength region of from 380 nm to 770 nm.

As the material used for the base material 11a and the base material 12a, for example, a glass substrate (for example, a non-alkali glass substrate, a soda glass substrate, a PYREX (registered trademark) glass substrate, a quartz glass substrate, or the like), a plastic substrate (for example, a polyethylene naphthalate (PEN) substrate, a polyethylene terephthalate (PET) substrate, a polycarbonate (PC) substrate, a polyimide (PI) substrate, or the like), a metal substrate such as an aluminum substrate or a stainless steel substrate, a semiconductor substrate such as a silicone substrate, or the like may be used. Among them, from the viewpoint of light transmitting property, a glass substrate or a plastic substrate is preferable.

Further, as the base material, a TFT substrate provided with a thin film transistor (TFT) can also be used. In this case, a form in which a conductive film is connected to the TFT (namely, a form in which the conductive film is a pixel electrode that is connected to the TFT) is preferable. By having this form, a voltage can be applied individually to every pixel and thus, it becomes possible to realize active driving of the entire image display device, similar to the case of a known liquid crystal display device equipped with a TFT.

In the TFT substrate, the configuration of the TFT, various wirings, a storage capacity, and the like may be a known configuration. For example, the configuration described in JP-A No. 2009-86668 can be referred to.

The conductive film 11b and the conductive film 12b may be either a transparent film or an opaque film, according to the display form of the device. The term "conductive film" refers to a film having conductivity, and the term "having conductivity" may refer to having at least an electric conductive property capable to apply a voltage, and specifically, refers to having the property of the surface resistance of 500 Ω/□ or less (preferably 70 Ω/□ or less, more preferably 60 Ω/ or less, and even more preferably 50 Ω/□ or less).

The conductive film may be either an opaque metal film such as a copper film, or a transparent film. However, from the viewpoint of imparting light transmitting property to perform image display, a transparent conductive film is preferable. It is preferable that the transparent conductive film has a transmission factor of 80% or higher (more preferably, 90% or higher) over the entire wavelength region of from 380 nm to 770 nm. Examples of the transparent conductive film include films containing at least one of indium tin oxide (ITO), indium zinc oxide (IZO), tin oxide, indium oxide, zirconium oxide, zinc oxide, cadmium oxide, or magnesium oxide. Among them, as the transparent conductive film, a film containing indium tin oxide (ITO) is preferable, from the viewpoints of the light transmitting property and conductivity.

The amount of tin oxide in the film containing ITO is preferably in a range of from 5% by mass to 15% by mass, and more preferably from 8% by mass to 12% by mass, from the viewpoint of reducing the resistance value.

The specific resistance of the conductive film is not particularly limited. For example, the specific resistance can be taken as $1.0 \times 10^{-3}$ $\Omega \cdot cm$ or less.

A preferable example of a form is a form in which an independent voltage is applied to each display cell (pixel) by applying an independent voltage to every display pixel (display cell) with regard to the conductive film $11b$ of the substrate $11$, while applying a common voltage to plural display cells that form display pixels with regard to the conductive film $12b$ of the substrate $12$. For this form, the form of a known liquid crystal display device can be referred to.

In the present exemplary embodiment, the substrate $12$ is provided as a substrate having conductivity, similar to the substrate $11$, but in another embodiment, the substrate $12$ may be a substrate that does not have a conductive film and does not have conductivity, and a voltage may be applied between the conductive film $11b$ and the hydrophilic liquid $14$. In this case, the constitution of the substrate $12$ is not particularly limited and, for example, a material exemplified above as the material used for the base material $12a$ can be used.

The hydrophobic insulating film $20$ is provided over the entire surface of the conductive film $11b$ of the substrate $11$, and is at least in contact with the oil $16$. This hydrophobic insulating film is mainly in the state of being in contact with the oil, when a voltage is not applied (at the time of image non-display), and when a voltage is applied (at the time of image display), the oil moves on its surface, and the region where the oil does not exist is brought into contact with the hydrophilic liquid.

The term "hydrophobic" refers to the property of the water contact angle of 60° or more (preferably 70° or more, and more preferably 80° or more) when water is contacted.

Specifically, the water contact angle is measured in accordance with the method described in "6. Sessile drop method" in JIS R3257 "Testing method of wettability of glass substrate surface".

More specifically, using a contact angle measuring device (trade name: Contact Angle Meter CA-A, manufactured by Kyowa Interface Science Co., Ltd.), a water droplet having a size of 20 points is made, then the water droplet is put out from the tip of a needle and is brought into contact with the hydrophobic insulating film to form a water droplet, which is allowed to stand for 10 seconds, and thereafter, the shape of the water droplet is observed from the peephole of the contact angle meter, whereby the contact angle θ (at 25° C.) is determined.

The term "insulating" refers to the property of the specific resistance of $10^7$ $\Omega \cdot cm$ or more (preferably $10^8$ $\Omega \cdot cm$ or more, and more preferably $10^9$ $\Omega \cdot cm$ or more). The specific resistance can be measured in accordance with, for example, JISC2526.

As the hydrophobic insulating film, an insulating film that exhibits affinity with the oil $16$ but has low affinity with the hydrophilic liquid $14$ can be used; however, from the viewpoint of suppressing the deterioration of film caused by the movement of oil due to repeatedly performing application of a voltage, a film which has a crosslinking structure derived from a polyfunctional compound is preferable. Above all, the hydrophobic insulating film is more preferably a film which has a crosslinking structure derived from a polyfunctional compound having two or more polymerizable groups. The crosslinking structure is suitably formed by polymerization using at least one kind of polyfunctional compound (as necessary, together with other monomer).

In the present exemplary embodiment, the hydrophobic insulating film is constituted by a copolymer obtained by copolymerization using a five-membered cyclic perfluorodiene.

The polyfunctional compound is a compound having two or more polymerizable groups in a molecule thereof. Examples of the polymerizable groups include radical-polymerizable groups, cation-polymerizable groups, and condensation-polymerizable groups. Above all, a (meth)acryloyl group, an allyl group, an alkoxysilyl group, an α-fluoroacryloyl group, an epoxy group, $-C(O)OCH=CH_2$, and the like are preferable. The two or more polymerizable groups included in the polyfunctional compound may be the same or different from each other.

In the formation of the crosslinking structure, the polyfunctional compounds may be used alone or in a combination of two or more of them.

As the polyfunctional compound, a known polyfunctional, polymerizable compound (a radical-polymerizable compound, a cation-polymerizable compound, a condensation-polymerizable compound, or the like) can be used.

Examples of the polyfunctional compound include, for example, polyfunctional acrylates such as ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethyloltricyclodecane diacrylate, neopentyl glycol hydroxypivalate diacrylate, 1,3-butylene glycol di(meth)acrylate, ethoxylated bisphenol-A di(meth)acrylate, propoxylated bisphenol-A di(meth)acrylate, cyclohexane dimethanol di(meth)acrylate, dimethyldicyclopentane diacrylate, trimethylolpropane triacrylate, ethoxylated trimethylolpropane triacrylate, propoxylated trimethylolpropane triacrylate, pentaerythritol triacrylate, terramethylolpropane triacrylate, terramethylolmethane triacrylate, pentaerythritol tetraacrylate, caprolactone modified trimethylolpropane triacrylate, ethoxylated isocyanuric acid triacrylate, tris(2-hydroxyethyl) isocyanurate triacrylate, propoxylated glycerol triacrylate, tetramethylolmethane tetraacrylate, ditrimethylolpropane tetraacrylate, ethoxylated pentaerythritol tetraacrylate, dipentaerythritol hexaacrylate, neopentyl glycol oligoacrylate, 1,4-butanediol oligoacrylate, 1,6-hexanediol oligoacrylate, trimethylolpropane oligoacrylate, pentaerythritol oligoacrylate, urethane acrylate, epoxy acrylate, polyester acrylate and the like.

As the polyfunctional compound, other than the above compounds, a polyfunctional, polymerizable compound selected as appropriate from known polymerizable compounds described in, for example, paragraphs 0031 to 0035 of JP-A No. 2008-181067, paragraphs 0149 to 0155 of JP-A No. 2008-139378, and paragraphs 0142 to 0146 of JP-A No. 2010-134137 can be used.

It is preferable that the polyfunctional compound has three or more (preferably four or more, and more preferably five or more) polymerizable groups in one molecule. Thereby, the density of the crosslinking structure in the film can be further increased, and therefore, the deterioration of the hydrophobic insulating film when application of a voltage is repeatedly performed may be further suppressed.

The polyfunctional compound is preferably a fluorine-containing compound, and more preferably a polyfunctional compound in which the percentage of the fluorine content is 35% by mass or higher (preferably, 40% by mass or higher, and more preferably, 45% by mass or higher) based on the molecular weight.

When the polyfunctional compound includes fluorine atoms (specifically, when the percentage of the fluorine content is 35% by mass or higher based on the molecular weight), the hydrophobicity of the hydrophobic insulating film is further enhanced.

There is no particular limitation as to the upper limit of the percentage of the fluorine content in the polyfunctional compound, but the upper limit may be, for example, 60% by mass (preferably 55% by mass, and more preferably 50% by mass) based on the molecular weight.

The method of polymerizing the polyfunctional compound is preferably bulk polymerization, or solution polymerization.

The method of initiating polymerization may be, for example, a method using a polymerization initiator (for example, a radical initiator), a method of irradiating with light or a radiation, a method of adding an acid, a method of adding a photo acid generator and then irradiating with light, or a method of heating to undergo dehydration condensation. These polymerization methods and polymerization initiation methods are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Technique of Polymer Synthesis)" by Takayuki Ohtu and Masaetu Kinoshita, Kagaku-Dojin Publishing Company Inc., 1972, pages 124 to 154.

The hydrophobic insulating film is preferably prepared by using a curable composition which includes the polyfunctional compound.

One or two or more of the polyfunctional compounds may be incorporated in the curable composition. The curable composition may further include a monofunctional compound.

As the monofunctional compound, a known monofunctional monomer can be used.

The content (in the case of using two or more kinds thereof, the total content; hereinafter, the same applies.) of the polyfunctional compound in the curable composition is not particularly limited. However, from the viewpoint of curability, the content of the polyfunctional compound is preferably 30% by mass or higher, more preferably 40% by mass or higher, and particularly preferably 50% by mass or higher, with respect to the total solids of the curable composition. Here, the term "total solids" refers to all components except solvent.

It is preferable that the curable composition further includes at least one solvent.

Examples of the solvent include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, propylene glycol monomethyl ether, propylene glycol monomethyl ether acetate, cyclohexanone, cyclohexanol, ethyl lactate, methyl lactate, and caprolactam.

The content (in the case of using two or more kinds thereof, the total content) of the solvent in the curable composition is preferably from 20% by mass to 90% by mass, more preferably from 30% by mass to 80% by mass, and particularly preferably from 40% by mass to 80% by mass, with respect to the total mass of the curable composition.

It is preferable that the curable composition further includes at least one polymerization initiator.

As the polymerization initiator, a polymerization initiator which generates a radical by the action of at least one of heat or light is preferable.

As the polymerization initiator that initiates radical polymerization by the action of heat, an organic peroxide, an inorganic peroxide, an organic azo compound, an organic diazo compound, or the like can be used.

Examples of the organic peroxide include benzoyl peroxide, halogenbenzoyl peroxide, lauroyl peroxide, acetyl peroxide, dibutyl peroxide, cumene hydroperoxide, butyl hydroperoxide and the like. Examples of the inorganic peroxide include hydrogen peroxide, ammonium peroxodisulfate, potassium peroxodisulfate and the like. Examples of the organic azo compound include 2-azo-bis-isobutyronitrile, 2-azo-bis-propionitrile, 2-azo-bis-cyclohexane dinitrile and the like. Examples of the diazo compound include diazoaminobenzene, p-nitrobenzene diazonium and the like.

Examples of the polymerization initiator that initiates radical polymerization by the action of light include compounds such as hydroxyalkylphenones, aminoalkylphenones, acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums and the like.

Examples of the hydroxyalkylphenones include 2-hydroxy-2-methyl-1-phenyl-1-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 1-hydroxydimethyl phenyl ketone, and 1-hydroxycyclohexyl phenyl ketone.

Examples of the aminoalkylphenones include 2-dimethylamino-2-(4-methylbenzyl)-1-(4-morpholin-4-ylphenyl)butan-1-one, 2-benzyl-2-dimethylamino-1-(4-morpholinophenyl)-butanon-1, and 2-methyl-1-(4-methylthio phenyl)-2-morpholinopropan-1-one.

Examples of the acetophenones include 2,2-diethoxyacetophenone and p-dimethylacetophenone. Examples of the benzoins include benzoin benzenesulfonate, benzoin toluenesulfonate, benzoin methyl ether, benzoin ethyl ether, and benzoin isopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

Further, a sensitizing dye may be used in combination with the above polymerization initiator.

The content of the polymerization initiator is not particularly limited, but the content is preferably from 0.1% by mass to 15% by mass, more preferably from 0.5% by mass to 10% by mass, and particularly preferably from 2% by mass to 5% by mass, with respect to the total solids of the curable composition.

The curable composition may include one or more additional components, as necessary.

Examples of the additional components include inorganic oxide fine particles, a silicone based antifouling agent or a fluorine-containing antifouling agent, a slipping agent, a polymerization inhibitor, a silane coupling agent, a surfactant, a thickener, and a leveling agent.

In a case in which the curable composition contain an additional component, the content of the additional component is preferably in a range of from 0% by mass to 30% by mass, more preferably in a range of from 0% by mass to 20% by mass, and particularly preferably in a range of from 0% by mass to 10% by mass, with respect to the total solids of the curable composition.

The film thickness of the hydrophobic insulating film is not particularly limited, but is preferably from 50 nm to 10 μm, and more preferably from 100 nm to 1 μm. The film thickness of the hydrophobic insulating film being within the above range is preferable in view of the balance between the insulating property and the drive voltage.

(Method of Forming Hydrophobic Insulating Film)

The hydrophobic insulating film can be suitably prepared by the following method. The method includes a curable layer forming process of forming a curable layer using the curable composition containing the polyfunctional compound on the surface side of the substrate 11 on which conductivity is provided, and a curing process of curing the curable layer by polymerizing the polyfunctional compound in the curable layer formed. By this method, a hydrophobic insulating film having a crosslinking structure is formed.

In a case of forming the hydrophobic insulating film 20, which is the curable layer, on the substrate 11, a known coating method or transfer method may be carried out.

In the case of the coating method, the curable composition is coated on the substrate 11 (and further, is preferably dried) to form a curable layer. As the method of coating, for example, a known method such as a spin coating method, a slit coating method, a dip coating method, an air knife coating method, a curtain coating method, a roller coating method, a wire bar coating method, a gravure coating method, or an extrusion coating method can be used.

In the case of the transfer method, a transfer material having a curable layer which is formed by using the curable composition is prepared in advance, and the curable layer of the transfer material is transferred onto the substrate 11, whereby a curable layer is formed on the substrate 11. For the details on the transfer method, description in, for example, paragraphs 0094 to 0121 of JP-A No. 2008-202006 or paragraphs 0076 to 0090 of JP-A No. 2008-139378 can be referred to.

The curing of the curable layer (polymerization of the polyfunctional compound) can be carried out by, for example, at least one of irradiation (hereinafter, also referred to as "exposure") with an actinic energy ray or heating.

As the actinic energy ray used in the exposure, for example, ultraviolet ray (g line, h line, i line, or the like), electron beam, or X-ray is preferably used. The exposure may be conducted by using a known exposure device of a proximity system, a mirror projection system, a stepper system, or the like.

The exposure value in the exposure may be, for example, from 10 mJ/cm$^2$ to 2000 mJ/cm$^2$, and is preferably from 50 mJ/cm$^2$ to 1000 mJ/cm$^2$.

Further, by exposing through a prescribed photomask in the exposure and subsequently developing using a developing solution such as an alkali solution, it is possible to obtain a hydrophobic insulating film which is patterned in a desired pattern.

The heating can be carried out by a known method using, for example, a hot plate or an oven.

The heating temperature can be set appropriately but, the heating temperature may be, for example, from 100° C. to 280° C., and is preferably from 150° C. to 250° C. The heating time can also be set appropriately but, the heating time may be, for example, from 2 minutes to 120 minutes, and is preferably from 5 minutes to 60 minutes.

In the present exemplary embodiment, the hydrophilic liquid 14 and the oil 16 are injected in the region between the hydrophobic insulating film 20 and the substrate 12.

Figure 2:
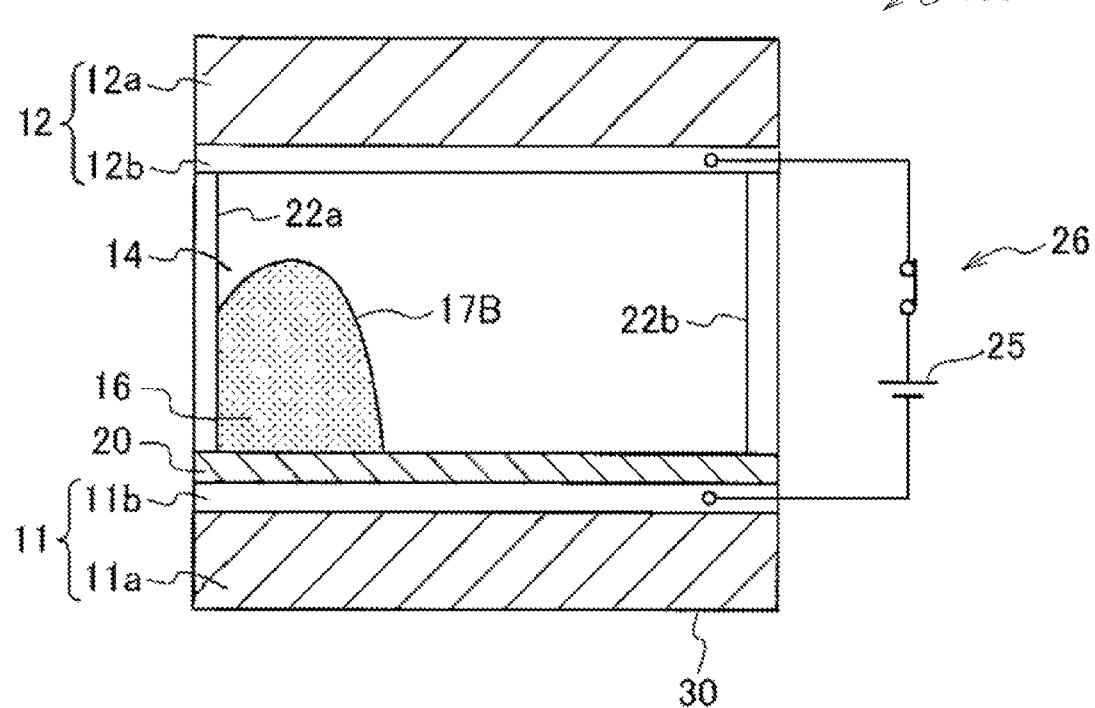
FIG. 2 is a schematic sectional view illustrating a state of voltage being applied (voltage on state) of the electrowetting display device of an exemplary embodiment of the present invention.

The hydrophilic liquid 14 and the oil 16 are liquids which do not mix with each other, and are separated from each other by interface 17A or interface 17B as shown in FIG. 1 and FIG. 2. It should be noted that, in FIG. 1 and FIG. 2, the interface 17A represents the interface between the hydrophilic liquid 14 and the oil 16 in the state of voltage being not applied (voltage off state), and the interface 17B represents the interface between the hydrophilic liquid 14 and the oil 16 in the state of voltage being applied (voltage on state).

The oil 16 is a non-conductive liquid that includes at least a nonpolar solvent and a methine dye containing two dye mother nuclei that are linked through a linking group having a methine unsaturated chain, and it is preferable that the percentage of the dye content is 10% by mass or higher with respect to the whole oil composition.

By the inclusion of the dye, the oil is colored, and when the percentage of the dye content is in the range of 10% by mass or higher (preferably, 20% by mass or higher), an image having higher contrast ratio and more excellent discrimination property and clearness may be obtained. In a composition containing a dye with such a concentration, the responsiveness of oil when a voltage is applied becomes easy to be deteriorated and the image display property becomes easy to be damaged; however, in the present invention, by the inclusion of a methine dye containing two dye mother nuclei that are linked through a linking group having a methine unsaturated chain, as the coloring material, the responsiveness of oil is improved, and the back flow when a voltage is applied is suppressed, and thus, an electrowetting display device having excellent image display property is obtained.

Here, the term "non-conductive" refers to the property of, for example, the specific resistance of $10^6$ Ω·cm or more (preferably, $10^7$ Ω·cm or more).

Further, it is preferable that the oil has a low relative dielectric constant.

Specifically, the relative dielectric constant of the oil is preferably in a range of 10.0 or less, and more preferably in a range of from 2.0 to 10.0. The relative dielectric constant being within this range is preferable in that the response speed is faster and driving (action) can be conducted at a lower voltage, as compared with the case in which the relative dielectric constant exceeds 10.0.

Here, the relative dielectric constant is a calculated value based on an electrical capacitance obtained by injecting the oil into a glass cell, which is equipped with an ITO transparent electrode and has a cell gap of 10 μm, and measuring the electric capacity of the cell thus obtained by using a model 2353 LCR meter (measuring frequency: 1 kHz), manufactured by NF Corporation, at 20° C. and 40% RH.

Further, it is preferable that the viscosity of the oil is 10 mPa·s or less, in terms of dynamic viscosity at 20° C. Above all, the viscosity is preferably 0.01 mPa·s or more, and more preferably from 0.01 mPa·s to 8 mPa·s. The viscosity of the oil being 10 mPa·s or less is preferable in that the response speed is faster and driving (action) can be conducted at a lower voltage, as compared with the case in which the viscosity exceeds 10 mPa·s.

Note that, the dynamic viscosity is a value measured by using a viscometer (model 500, manufactured by Toki Sangyo Co., Ltd.) under the condition of 20° C.

It is preferable that the oil does not substantially mix with the hydrophilic liquid described below.

Specifically, the solubility (at 25° C.) of the oil with respect to the hydrophilic liquid is preferably 0.1% by mass or lower, more preferably 0.01% by mass or lower, and particularly preferably 0.001% by mass or lower.

—Nonpolar Solvent—

It is preferable that the oil 16 contains at least one nonpolar solvent as the solvent. Here, the term "nonpolar solvent" refers to a solvent that has a low dielectric constant value (a so-called an apolor solvent).

Examples of the nonpolar solvent include an aliphatic hydrocarbon solvent (preferably, an aliphatic hydrocarbon solvent having from 6 to 30 carbon atoms), for example, n-hexane, n-decane, dodecane, tetradecane, hexadecane, or the like; a solvent obtained by substituting the above aliphatic hydrocarbon solvent with fluorine (for example, fluorocarbon oil or the like); and a silicone-containing solvent (for example, silicone oil or the like). Among them, an aliphatic hydrocarbon solvent is preferable.

A content of dissolved oxygen in the nonpolar solvent is preferably in a range of 10 ppm or less. When the content of dissolved oxygen exceeds 10 ppm, a component such as nonpolar solvent becomes easy to deteriorate, and the response speed becomes easy to slow down. The content of dissolved oxygen is the lower the better, and is preferably 8 ppm or less. The content of dissolved oxygen is measured with, for example, a dissolved oxygen meter (DO meter).

The content of the nonpolar solvent in the oil is preferably 30% by mass or higher, and more preferably 40% by mass or higher, with respect to the total mass of the oil. When the content of the nonpolar solvent is 30% by mass or higher, more excellent optical shutter characteristics can be realized. Further, the solubility of the dye in the oil may be maintained more satisfactorily.

Furthermore, the oil may contain other solvent other than the nonpolar solvent. In the case, the content of the nonpolar solvent is preferably 70% by mass or higher, and more preferably 90% by mass or higher, with respect to the total mass of the solvent included in the oil.

—Coloring Material—

From the viewpoint of displaying a colored image, the oil 16 contains at least one kind of a methine dye containing two dye mother nuclei that are linked through a linking group having a methine unsaturated chain (hereinafter, may be referred to as "a methine dye in the present invention"), as the coloring material. As the dye, a dye having solubility with respect to a nonpolar solvent is suitably selected.

The methine dye is not particularly limited, as long as the dye has a structure, in which two dye mother nuclei are linked together by a linking group having a methine unsaturated chain, and has solubility with respect to a nonpolar solvent. As the methine dye, a known methine dye can be arbitrary selected and used.

This methine dye is preferably a methine dye having a solubility with respect to n-hexane at 25° C. and 0.1 MPa of 1% by mass or higher, from the viewpoint of responsiveness of the oil phase when a voltage is applied, and is preferably a methine dye having an excellent solubility with respect to a nonpolar solvent, specifically, solubility with respect to a hydrocarbon solvent. When the solubility is 1% by mass or higher, the dye is more suitable for an electrowetting display device.

Note that, hereinafter, the "solubility with respect to n-hexane at 25° C. and 0.1 MPa" may also be referred to as, simply, "solubility".

In a case in which the methine dye according to the present invention is used in the oil which is a member for a display, the member being used for producing a display device that acts according to the theory of the electrowetting method, the solubility is more preferably 3% by mass or higher, and even more preferably 5% by mass or higher. The solubility is the higher the better, but the upper limit thereof is generally about 80% by mass.

The molecular weight of the methine dye is preferably 200 or more but less than 3000, and more preferably 200 or more but less than 2000. When the molecular weight is 200 or more, solubility with respect to the nonpolar solvent can be secured, and when the molecular weight is less than 3000, the solubility with respect to the nonpolar solvent can be maintained to an extent of not impairing the responsiveness at the time of image display.

In the oil, one kind of the coloring materials may be used alone, or two or more kinds of them may be used in combination. Accordingly, the oil according to the present invention may be an oil configured to include one kind of the methine dyes in the present invention, or may be an oil configured to include two ore more kinds of them.

The total amount of coloring materials including the methine dye in the present invention, which are contained in the oil, is preferably 10% by mass or higher with respect to the total amount of the oil. From the viewpoints of enhancing the density and clearness of the displayed image and the like, the total amount of the coloring materials (including the methine dye in the present invention) is preferably in a range of 20% by mass or higher, more preferably in a range of 40% by mass or higher, and even more preferably in a range of 50% by mass or higher, with respect to the total amount of the oil. When the percentage of the content of the coloring materials included in the oil gets higher, the responsiveness of the oil when a voltage is applied is deteriorated, and the back flow phenomenon in a voltage on state is also deteriorated, and thus the image display property tends to be lowered. Therefore, in an oil composition in which the percentage of the coloring material content is 10% by mass or higher (more preferably, 20% by mass or higher), particularly, the effect of the present invention is further achieved. Further, from the viewpoint of increasing the response speed, the total amount of the coloring materials is preferably 80% by mass or lower, more preferably 75% by mass or lower, and even more preferably 70% by mass or lower, with respect to the total amount of the oil. Above all, the case is more preferable, in which the percentage of the content of the methine dye according to the present invention in the oil is 5% by mass or higher with respect to the total amount of the oil.

Concerning the concentration (C) of the methine dye according to the present invention in the oil, the concentration can be arbitrary selected depending on the purpose, and the oil can be prepared with any concentration. When used as the dye for an electrowetting display, the concentration of the dye is generally 0.2% by mass or higher, and the dye is used by diluting with a nonpolar solvent according to the $\in C$ ($=\in \times C$ [$\in$: an absorption coefficient of the oil]) value needed.

The molar absorption coefficient of the methine dye in the present invention is not particularly limited, but the case in which the molar absorption coefficient is 30,000 or more is preferable, and particularly preferably 50,000 or more. When the molar absorption coefficient is 30,000 or more, high display performance and responsiveness can both be achieved easily, which is thus preferable.

As the OD (image density) value of the electrowetting display device of the present invention gets higher, the distinguishability and clearness of the image are more improved. Therefore, the OD value at the maximum absorption wavelength of the methine dye according to the invention per thickness of the oil layer is preferably 0.5/μm or more, more preferably 0.65/μm or more, and even more preferably 1.0/μm or more.

It is preferable that the methine dye in the present invention is a compound that does not contain a metal atom in the molecule. In this case, the methine dye in the present invention does not include a dye compound containing a metal atom or metal compound which forms a complex. In the present invention, it is preferable that the dye does not contain a metal atom in the molecule, from the viewpoint of the solubility of the coloring material and from the viewpoint of obtaining transparency of the display device. A methine dye having such a structure has high solubility with respect to a nonpolar solvent, and exhibits low adsorption to a base material such as glass or the like, and thus it is advantageous in that residual color caused by the dye in the oil is less likely to occur.

Specifically, it is preferable that the methine dye in the present invention does not include, for example, a complex in which the dye represented by Formula (1) to Formula (4) described below is coordinated to a metal or a compound thereof.

The methine dye in the present invention is preferably a dye represented by Formula (1) described below. Since this dye has a structure in which two dye mother nuclei are linked through a methine unsaturated chain and does not have a dissociative group, the dye has good solubility with respect to a nonpolar solvent (specifically, a hydrocarbon solvent), and in a case in which the dye is applied to a display device, that acts according to the theory of the electrowetting method, to display an image, excellent responsiveness and excellent back flow resistance characteristic are realized. Also in the case of constituting a solution (oil) such that the dye is contained in an amount of 20% by mass or more in the nonpolar solvent, excellent responsiveness is realized, and the back flow ratio is suppressed low, which is thus preferable. In the case of using the electrowetting method, the limit value of the dye concentration, which generally indicates excellent responsiveness and back flow ratio, is the higher the better.

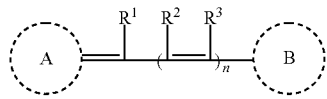

Formula (1)

The methine dye represented by Formula (1) above is a dye that does not have, in a molecule thereof, a dissociative group (an NH group is not contained), such as $-SO_3H$, $-PO_3H_2$, $-CO_2H$, or $-OH$, and exhibits good solubility with respect to a nonpolar solvent. From the viewpoint of having more excellent solubility with respect to the nonpolar solvent, it is preferable that the dye has a straight-chain or branched alkyl group having from 4 to 30 carbon atoms in a molecule thereof. It is assumed that, according to such a structural feature, the dye represented by Formula (1) has an SP value (solubility parameter) near the SP value of the non-polar solvent, and thus miscibility with the solvent is improved.

Based on the reasons as described above, in a case in which the methine dye according to the present invention has the above straight-chain or branched alkyl group in a molecule thereof, the alkyl group is more preferably a straight-chain or branched alkyl group having from 6 to 16 carbon atoms. These alkyl groups in the dye molecule preferably have from 10 to 200 carbon atoms in total, and more preferably from 30 to 100 carbon atoms in total.

Further, the term "SP value" (unit: $(cal/cm^3)^{1/2}$) used in the present invention is a value calculated using the following equation according to the Fedors' method.

$$SP \text{ value } (\delta) = [\Sigma E_{coh}/\Sigma V]^{1/2}$$

Here, $\Sigma E_{coh}$ represents the cohesive energy, and $\Sigma V$ represents the molar molecular volume.

Details of the above "Fedors' method" are described in R. F. Fedors, "Polymer Engineering Science", 14, pages 147 to 154 (1967), and the SP values in the invention are calculated by the method described in this literature.

In Formula (1) above, A and B each independently represent a dye mother nucleus that does not have a dissociative group. In this dye, as shown in Formula (1) above, A and B, each representing a dye mother nucleus, are linked together by a single methine unsaturated chain or plural, continuous, methine unsaturated chains.

The dye mother nucleus represented by A or B refers to a molecular structure (chromophore (mother skeleton)) needed to develop a color. Namely, the dye mother nucleus is a partial structure which is constituted by continuous unsaturated bonds in the compound (a partial structure needed to form a conjugated system), and is, for example, a partial structure in which an aromatic series, $>C=C<$, $>C=O$, $>C=N-$, $-N=N-$, or the like is linked. Specific examples of the dye mother nucleus include a pyrrole skeleton, an azepine skeleton, an isooxazolone skeleton, a pyrazolone skeleton, a pyrazolotriazole skeleton, a pyrrolotriazole skeleton, a benzoquinone skeleton, a naphthoquinone skeleton, a pyridone skeleton, a barbiturate skeleton, a pyrimidine skeleton, a thiobarbiturate skeleton, and an anilido skeleton.

A and B may be the same as or different from each other; however, from the viewpoint of exhibiting better responsiveness, it is preferable that A and B have the same skeleton.

Specifically, the dye mother nucleus is preferably a molecular skeleton including a 5- to 7-membered hydrocarbon ring or a 5- to 7-membered heterocycle. Examples of the hydrocarbon ring or the heterocycle include a benzene ring, a pyrazole ring, an isooxazole ring, a pyrazolotriazole ring, a pyrrolotriazole ring, a naphthalene ring, a pyridone ring, a barbiturate ring, a thiobarbiturate ring, a pyrimidine ring, a pyrrole ring, and an azepine ring.

Above all, it is preferable that at least one of A or B that represents a dye mother nucleus is a heterocycle containing one or more nitrogen atoms.

A and B each preferably represent, among the above rings, a pyrrole ring, an azepine ring, a pyrazole ring, an isooxazole ring, a pyrazolotriazole ring, a pyrrolotriazole ring, a benzene ring, or a naphthalene ring.

The ring represented by A or B may be unsubstituted or substituted. In a case in which A or B is substituted, the substituent has the same definition as the "monovalent substituent" represented by $R^4$ to $R^9$ in Formula (3) described below, and so are the preferable embodiments.

$R^1$, $R^2$, and $R^3$ each independently represent a hydrogen atom, a halogen atom, an alkyl group, an aryl group, or a heterocyclic group. The case in which $R^1$, $R^2$, and $R^3$ all represent a hydrogen atom is preferable in view of maintaining the absorption coefficient high.

Examples of the halogen atom include a fluorine atom, a chlorine atom, and a bromine atom.

The alkyl group is preferably an alkyl group having from 1 to 48 carbon atoms, and more preferably a straight-chain, branched, or cyclic alkyl group having from 1 to 24 carbon atoms. Examples include a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, and a 1-adamantyl group.

The aryl group is preferably an aryl group having from 6 to 48 carbon atoms, and more preferably an aryl group having from 6 to 24 carbon atoms. Examples include a phenyl group and a naphthyl group.

The heterocyclic group is preferably a heterocyclic group having from 1 to 32 carbon atoms, and more preferably a heterocyclic group having from 1 to 18 carbon atoms. Examples include a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazol-1-yl group.

n represents 0, 1 or 2. When n is within the range of from 0 to 2, the maximum absorption wavelength of the dye is present in the visible region.

Among the dyes represented by Formula (1) above, a dye represented by the following Formula (2) is preferable.

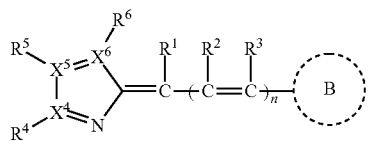

Formula (2)

In Formula (2) above, $R^1$, $R^2$, and $R^3$ each independently represent a hydrogen atom, a halogen atom, an alkyl group, an aryl group, or a heterocyclic group. The halogen atom, alkyl group, aryl group, and heterocyclic group represented by $R^1$, $R^2$, or $R^3$ have the same definitions as the halogen atom, alkyl group, aryl group, and heterocyclic group represented by $R^1$, $R^2$, or $R^3$ in Formula (1) above, respectively, and so are the preferable embodiments.

The case in which $R^1$, $R^2$, and $R^3$ all represent a hydrogen atom is preferable in view of maintaining the absorption coefficient high.

$R^4$, $R^5$, and $R^6$ each independently represent a hydrogen atom or a monovalent substituent. The monovalent substituent represented by $R^4$, $R^5$, or $R^6$ has the same definition as the "monovalent substituent" represented by $R^4$ to $R^9$ in Formula (3) described below, and so are the preferable embodiments.

Above all, from the viewpoint of enhancing the solubility with respect to the nonpolar solvent, it is preferable that at least one of $R^4$, $R^5$, or $R^6$ is a straight-chain or branched alkyl group having from 4 to 30 carbon atoms (preferably, from 6 to 30 carbon atoms, and more preferably from 6 to 16 carbon atoms).

$X^4$, $X^5$, and $X^6$ each independently represent a carbon atom or a nitrogen atom. However, in a case in which $X^4$ represents a nitrogen atom, $R^4$ does not exist; in a case in which $X^5$ represents a nitrogen atom, $R^5$ does not exist; and in a case in which $X^6$ represents a nitrogen atom, $R^6$ does not exist.

Further, in view of making the maximum absorption wavelength of the dye to be present in the visible region, n represents 0, 1, or 2.

B represents a dye mother nucleus that does not have a dissociative group. The dye mother nucleus represented by B has the same definition as the dye mother nucleus represented by B in Formula (1) above, and so are the preferable embodiments.

Among the methine dyes represented by Formula (1) or Formula (2) above, a methine dye represented by the following Formula (3) is preferable.

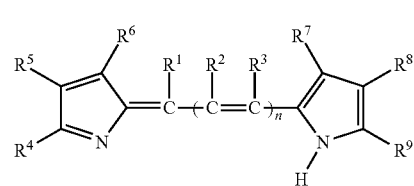

Formula (3)

$R^1$, $R^2$, and $R^3$ each independently represent a hydrogen atom, a halogen atom, an alkyl group, an aryl group, or a heterocyclic group. $R^4$, $R^5$, $R^6$, $R^7$, $R^8$, and $R^9$ each independently represent a hydrogen atom or a monovalent substituent. n represents 0, 1, or 2. From the viewpoint of enhancing the solubility with respect to the nonpolar solvent, the "monovalent substituent" is the more hydrophobic the better. Specifically, the ratio of alkyl groups is the higher the better. It is more preferable that the alkyl group does not have a ring.

Examples of the monovalent substituent represented by $R^4$ to $R^9$ include:

a halogen atom (for example, a fluorine atom, a chlorine atom, a bromine atom, or the like), an alkyl group (a straight-chain, branched, or cyclic alkyl group having preferably from 1 to 48 carbon atoms, more preferably from 1 to 24 carbon atoms, for example, a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, a 1-adamantyl group, or the like), an alkenyl group (an alkenyl group having preferably from 2 to 48 carbon atoms, more preferably from 2 to 18 carbon atoms, for example, a vinyl group, an allyl group, a 3-buten-1-yl group, or the like), an aryl group (an aryl group having preferably from 6 to 48 carbon atoms, more preferably from 6 to 24 carbon atoms, for example, a phenyl group, a naphthyl group, or the like), a heterocyclic group (a heterocyclic group having preferably from 1 to 32 carbon atoms, more preferably from 1 to 18 carbon atoms, for example, a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, a benzotriazol-1-yl group, or the like), a silyl group (a silyl group having preferably from 3 to 38 carbon atoms, more preferably from 3 to 18 carbon atoms, for example, a trimethylsilyl group, a triethylsilyl group, a tributylsilyl group, a t-butyldimethylsilyl group, a t-hexyldimethylsilyl group, or the like), a hydroxyl group, a cyano group, a nitro group, an alkoxy group (an alkoxy group having preferably from 1 to 48 carbon atoms, more preferably from 1 to 24 carbon atoms, for example, a methoxy group, an ethoxy group, a 1-butoxy group, a 2-butoxy group, an isopropoxy group, a t-butoxy group, a dodecyloxy group, a cycloalkyloxy group (such as a cyclopentyloxy group or a cyclohexyloxy group), or the like), an aryloxy group (an aryloxy group having preferably from 6 to 48 carbon atoms, more preferably from 6 to 24 carbon atoms, for example, a phenoxy group, a 1-naphthoxy group, or the like), a heterocyclic oxy group (a heterocyclic oxy group having preferably from 1 to 32 carbon atoms, more preferably from 1 to 18 carbon atoms, for example, a 1-phenyltetrazol-5-oxy group, a 2-tetrahydropyranyloxy group, or the like), a silyloxy group (a silyloxy group having preferably from 1 to 32 carbon atoms, more preferably from 1 to 18 carbon atoms, for example, a trimethylsilyloxy group, a t-butyldimethylsilyloxy group, a diphenylmethylsilyloxy group, or the like), an acyloxy group (an acyloxy group having preferably from 2 to 48 carbon atoms, more preferably from 2 to 24 carbon atoms, for example, an acetoxy group, a pivaloyloxy group, a benzoyloxy group, a dodecanoyloxy group, or the like), an alkoxycarbonyloxy group (an alkoxycarbonyloxy group having preferably from 2 to 48 carbon atoms, more preferably from 2 to 24 carbon atoms, for example, an ethoxycarbonyloxy group, a t-butoxycarbonyloxy group, a cycloalkyloxycarbonyloxy group (such as a cyclohexyloxycarbonyloxy group), or the like), an aryloxycarbonyloxy group (an aryloxycarbonyloxy group having preferably from 7 to 32 carbon atoms, more preferably from 7 to 24 carbon atoms, for example, a phenoxycarbonyloxy group or the like), a carbamoyloxy group (a carbamoyloxy group having preferably from 1 to 48 carbon atoms, more preferably from 1 to 24 carbon atoms, for example, an N,N-dimethylcarbamoyloxy group, an N-butylcarbamoyloxy group, an N-phenylcarbamoyloxy group, an N-ethyl-N-phenylcarbamoyloxy group, or the like), a sulfamoyloxy group (a sulfamoyloxy group having preferably from 1 to 32 carbon atoms, more preferably from 1 to 24 carbon atoms, for example, an N,N-diethylsulfamoyloxy group, an N-propylsulfamoyloxy group, or the like), an alkylsulfonyloxy group (an alkylsulfonyloxy group having preferably from 1 to 38 carbon atoms, more preferably from 1 to 24 carbon atoms, for example, a methylsulfonyloxy group, a hexadecylsulfonyloxy group, a cyclohexylsulfonyloxy group, or the like), an arylsulfonyloxy group (an arylsulfonyloxy group having preferably from 6 to 32 carbon atoms, more preferably from 6 to 24 carbon atoms, for example, a phenylsulfonyloxy group or the like), an acyl group (an acyl group having preferably from 1 to 48 carbon atoms, more preferably from 1 to 24 carbon atoms, for example, a formyl group, an acetyl group, a pivaloyl group, a benzoyl group, a tetradecanoyl group, a cyclohexanoyl group, or the like), an alkoxycarbonyl group (an alkoxycarbonyl group having preferably from 2 to 48 carbon atoms, more preferably from 2 to 24 carbon atoms, for example, a methoxycarbonyl group, an ethoxycarbonyl group, an octadecyloxycarbonyl group, a cyclohexyloxycarbonyl group, a 2,6-di-tert-butyl-4-methylcyclohexyloxycarbonyl group, or the like), an aryloxycarbonyl group (an aryloxycarbonyl group having preferably from 7 to 32 carbon atoms, more preferably from 7 to 24 carbon atoms, for example, a phenoxycarbonyl group or the like), a carbamoyl group (a carbamoyl group having preferably from 1 to 48 carbon atoms, more preferably from 1 to 24 carbon atoms, for example, a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, an N-methyl-N-phenylcarbamoyl group, an N,N-dicyclohexylcarbamoyl group, or the like), an amino group (an amino group having preferably 32 or less carbon atoms, more preferably 24 or less carbon atoms, for example, an amino group, a methylamino group, an N,N-dibutylamino group, a tetradecylamino group, a 2-ethylhexyl amino group, a cyclohexyl amino group, or the like), an anilino group (an anilino group having preferably from 6 to 32 carbon atoms, more preferably from 6 to 24 carbon atoms, for example, an anilino group, an N-methylanilino group, or the like), a heterocyclic amino group (a heterocyclic amino group having preferably from 1 to 32 carbon atoms, more preferably from 1 to 18 carbon atoms, for example, a 4-pyridylamino group or the like), a carbonamido group (a carbonamido group having preferably from 2 to 48 carbon atoms, more preferably from 2 to 24 carbon atoms, for example, an acetamido group, a benzamido group, a tetradecanamido group, a pivaloylamido group, a cyclohexanamido group, or the like), a ureido group (a ureido group having preferably from 1 to 32 carbon atoms, more preferably from 1 to 24 carbon atoms, for example, a ureido group, an N,N-dimethylureido group, an N-phenylureido group, or the like), an imido group (an imido group having preferably 36 or less carbon atoms, more preferably 24 or less carbon atoms, for example, an N-succinimido group, an N-phthalimido group, or the like), an alkoxycarbonylamino group (an alkoxycarbonylamino group having preferably from 2 to 48 carbon atoms, more preferably from 2 to 24 carbon atoms, for example, a methoxycarbonylamino group, an ethoxycarbonylamino group, a t-butoxycarbonylamino group, an octadecyloxycarbonylamino group, a cyclohexyloxycarbonylamino group, or the like), an aryloxycarbonylamino group (an aryloxycarbonylamino group having preferably from 7 to 32 carbon atoms, more preferably from 7 to 24 carbon atoms, for example, a phenoxycarbonylamino group or the like), a sulfonamido group (a sulfonamido group having preferably from 1 to 48 carbon atoms, more preferably from 1 to 24 carbon atoms, for example, a methane sulfonamido group, a butane sulfonamido group, a benzene sulfonamido group, a hexadecane sulfonamido group, a cyclohexane sulfonamido group, or the like), a sulfamoylamino group (a sulfamoylamino group having preferably from 1 to 48 carbon atoms, more preferably from 1 to 24 carbon atoms, for example, an N,N-dipropylsulfamoylamino group, an N-ethyl-N-dodecylsulfamoylamino group, or the like), an azo group (an azo group having preferably from 1 to 32 carbon atoms, more preferably from 1 to 24 carbon atoms, for example, a phenylazo group, a 3-pyrazolyl azo group, or the like), an alkylthio group (an alkylthio group having preferably from 1 to 48 carbon atoms, more preferably from 1 to 24 carbon atoms, for example, a methylthio group, an ethylthio group, an octylthio group, a cyclohexylthio group, or the like), an arylthio group (an arylthio group having preferably from 6 to 48 carbon atoms, more preferably from 6 to 24 carbon atoms, for example, a phenylthio group or the like), a heterocyclic thio group (a heterocyclic thio group having preferably from 1 to 32 carbon atoms, more preferably from 1 to 18 carbon atoms, for example, a 2-benzothiazolylthio group, a 2-pyridylthio group, a 1-phenyltetrazolylthio group, or the like), an alkylsulfinyl group (an alkylsulfinyl group having preferably from 1 to 32 carbon atoms, more preferably from 1 to 24 carbon atoms, for example, a dodecanesulfinyl group or the like), an arylsulfinyl group (an arylsulfinyl group having preferably from 6 to 32 carbon atoms, more preferably from 6 to 24 carbon atoms, for example, a phenylsulfinyl group or the like), an alkylsulfonyl group (an alkylsulfonyl group having preferably from 1 to 48 carbon atoms, more preferably from 1 to 24 carbon atoms, for example, a methylsulfonyl group, an ethylsulfonyl group, a propylsulfonyl group, a butylsulfonyl group, an isopropylsulfonyl group, a 2-ethylhexyl sulfonyl group, a hexadecylsulfonyl group, an octylsulfonyl group, a cyclohexylsulfonyl group, or the like), an arylsulfonyl group (an arylsulfonyl group having preferably from 6 to 48 carbon atoms, more preferably from 6 to 24 carbon atoms, for example, a phenylsulfonyl group, a 1-naphthylsulfonyl group, or the like), a sulfamoyl group (a sulfamoyl group having preferably 32 or less carbon atoms, more preferably 24 or less carbon atoms, for example, a sulfamoyl group, an N,N-dipropylsulfamoyl group, an N-ethyl-N-dodecylsulfamoyl group, an N-ethyl-N-phenylsulfamoyl group, an N-cyclohexylsulfamoyl group, or the like), a sulfo group, a phosphonyl group (a phosphonyl group having preferably from 1 to 32 carbon atoms, more preferably from 1 to 24 carbon atoms, for example, a phenoxyphosphonyl group, an octyloxyphosphonyl group, a phenylphosphonyl group, or the like), and a phosphinoylamino group (a phosphinoylamino group having preferably from 1 to 32 carbon atoms, more preferably from 1 to 24 carbon atoms, for example, a diethoxyphosphinoylamino group, a dioctyloxyphosphinoylamino group, or the like).

In a case in which the above monovalent substituent is a group capable of being further substituted, the group may be further substituted with any of the above-described group. In a case in which the monovalent substituent has two or more substituents, these substituents may be identical or different.

In Formula (3), $R^1$ and $R^2$, $R^2$ and $R^3$, $R^4$ and $R^5$, $R^5$ and $R^6$, $R^7$ and $R^8$, and $R^8$ and $R^9$ may each independently bond to each other to form a 5-membered, 6-membered, or 7-membered ring. The ring to be formed may be a saturated ring or an unsaturated ring. Examples of the 5-membered, 6-membered, or 7-membered, saturated or unsaturated ring include a pyrrole ring, a furan ring, a thiophene ring, a pyrazole ring, an imidazole ring, a triazole ring, an oxazole ring, a thiazole ring, a pyrrolidine ring, a piperidine ring, a cyclopentene ring, a cyclohexene ring, a benzene ring, a pyridine ring, a pyrazine ring, and a pyridazine ring. Preferable examples include a benzene ring and a pyridine ring.

In a case in which the 5-membered, 6-membered, or 7-membered ring to be formed is a group capable of being further substituted, the ring may be further substituted with any of the above-described monovalent substituent. In the case of being substituted with two or more substituents, these substituents may be identical or different.

Further, in Formula (3), the halogen atom, alkyl group, aryl group, and heterocyclic group represented by $R^1$, $R^2$, or $R^3$ have the same definitions as the halogen atom, alkyl group, aryl group, and heterocyclic group represented by $R^1$, $R^2$, or $R^3$ in Formula (1) above, respectively, and so are the preferable embodiments.

Above all, the case in which $R^1$, $R^2$, and $R^3$ all represent a hydrogen atom is preferable in view of maintaining the absorption coefficient high.

In Formula (3), $R^4$ and $R^9$ each preferably represent, among the above-described groups, an alkylamino group, an arylamino group, a carbonamido group, a ureido group, an imido group, an alkoxycarbonylamino group, or a sulfonamido group; more preferably a carbonamido group, a ureido group, an alkoxycarbonylamino group, or a sulfonamido group; and even more preferably a carbonamido group or a ureido group.

Further, $R^5$ and $R^8$ each preferably represent, among the above-described groups, an alkoxycarbonyl group, an aryloxycarbonyl group, a carbamoyl group, an alkylsulfonyl group, an arylsulfonyl group, a nitrile group, an imido group, or a carbamoylsulfonyl group; more preferably an alkoxycarbonyl group, an aryloxycarbonyl group, a carbamoyl group, an alkylsulfonyl group, a cyano group, an imido group, or a carbamoylsulfonyl group; even more preferably an alkoxycarbonyl group, an aryloxycarbonyl group, a carbamoyl group, a cyano group, an imido group, or a carbamoylsulfonyl group; and particularly preferably an alkoxycarbonyl group, an aryloxycarbonyl group, or a carbamoyl group.

Furthermore, $R^6$ and $R^7$ each preferably represent, among the above-described groups, a substituted or unsubstituted alkyl group, a substituted or unsubstituted aryl group, or a substituted or unsubstituted heterocyclic group, and more preferably a substituted or unsubstituted alkyl group, or a substituted or unsubstituted aryl group.

In Formula (3), in a case in which $R^6$ and $R^7$ each represent an alkyl group, the alkyl group is preferably a straight-chain, branched, or cyclic, substituted or unsubstituted alkyl group having from 1 to 12 carbon atoms, and more specifically, examples include a methyl group, an ethyl group, an n-propyl group, an isopropyl group, a cyclopropyl group, an n-butyl group, an i-butyl group, a t-butyl group, a cyclobutyl group, a cyclopentyl group, a cyclohexyl group, and a benzyl group. Among them, the alkyl group is more preferably a branched or cyclic, substituted or unsubstituted alkyl group having from 1 to 12 carbon atoms, and more specifically, examples include an isopropyl group, a cyclopropyl group, an i-butyl group, a t-butyl group, a cyclobutyl group, a cyclopentyl group, and a cyclohexyl group. The alkyl group is even more preferably a secondary or tertiary, substituted or unsubstituted alkyl group having from 1 to 12 carbon atoms, and more specifically, examples include an isopropyl group, a cyclopropyl group, an i-butyl group, a t-butyl group, a cyclobutyl group, and a cyclohexyl group.

In a case in which $R^6$ and $R^7$ each represent an aryl group, the aryl group is preferably a substituted or unsubstituted phenyl group, or a substituted or unsubstituted naphthyl group, and more preferably a substituted or unsubstituted phenyl group.

In a case in which $R^6$ and $R^7$ each represent a heterocyclic group, the heterocyclic group is preferably a substituted or unsubstituted 2-thienyl group, a substituted or unsubstituted 4-pyridyl group, a substituted or unsubstituted 3-pyridyl group, a substituted or unsubstituted 2-pyridyl group, a substituted or unsubstituted 1-pyridyl group, a substituted or unsubstituted 2-furyl group, a substituted or unsubstituted 2-pyrimidinyl group, a substituted or unsubstituted 2-benzothiazolyl group, a substituted or unsubstituted 1-imidazolyl group, a substituted or unsubstituted 1-pyrazolyl group, or a substituted or unsubstituted benzotriazol-1-yl group, and more preferably a substituted or unsubstituted 2-thienyl group, a substituted or unsubstituted 4-pyridyl group, a substituted or unsubstituted 2-furyl group, a substituted or unsubstituted 2-pyrimidinyl group, or a substituted or unsubstituted 1-pyridyl group.

Among the above-described groups, from the viewpoint of enhancing the solubility with respect to the nonpolar solvent, it is more preferable that at least one from among $R^4$, $R^5$, $R^6$, $R^7$, $R^8$, and $R^9$, or at least one of $R^4$, $R^5$, or $R^6$ and at least one of $R^7$, $R^8$, or $R^9$ represent(s) a straight-chain or branched alkyl group having from 4 to 30 carbon atoms (preferably from 6 to 30 carbon atoms, and more preferably from 6 to 16 carbon atoms), and it is even more preferable that $R^6$ and/or $R^7$ represent(s) a straight-chain or branched alkyl group having from 6 to 30 carbon atoms (more preferably from 6 to 16 carbon atoms).

Based on the reasons as described above, the case is more preferable, in which $R^6$ and $R^7$ each represent a straight-chain or branched alkyl group having from 1 to 30 carbon atoms (more preferably from 3 to 16 carbon atoms), $R^5$ and $R^8$ each represent an alkoxycarbonyl group having from 4 to 24 carbon atoms or a carbamoyl group having from 4 to 24 carbon atoms, and $R^4$ and $R^9$ each represent a carbamoyl group having from 4 to 24 carbon atoms.

Among the dyes represented by Formula (1) to (3) above, a methine dye (a dipyrromethene dye) represented by the following Formula (4) is preferable.

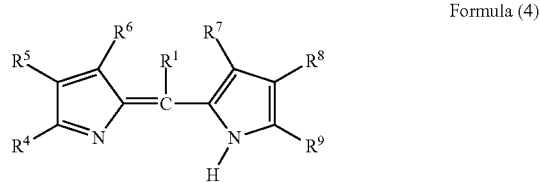

Formula (4)

In Formula (4) above, $R^1$ represents a hydrogen atom, a halogen atom, an alkyl group, an aryl group, or a heterocyclic group. $R^4$, $R^5$, $R^6$, $R^7$, $R^8$, and $R^9$ each independently represent a hydrogen atom or a monovalent substituent.

$R^1$ and $R^4$, $R^5$, $R^6$, $R^7$, $R^8$, and $R^9$ in Formula (4) have the same definitions as $R^1$ and $R^4$, $R^5$, $R^6$, $R^7$, $R^8$, and $R^9$ in Formula (3), respectively, and so are the preferable embodiments.

Also in Formula (4), from the viewpoint of enhancing the solubility with respect to the nonpolar solvent, it is more preferable that at least one from among $R^4$, $R^5$, $R^6$, $R^7$, $R^8$, and $R^9$, or at least one of $R^4$, $R^5$, or $R^6$ and at least one of $R^7$, $R^8$, or $R^9$ represent(s) a straight-chain or branched alkyl group having from 4 to 30 carbon atoms (preferably from 6 to 30 carbon atoms, and more preferably from 6 to 16 carbon atoms), and it is even more preferable that $R^6$ and/or $R^7$ represent(s) a straight-chain or branched alkyl group having from 1 to 30 carbon atoms (more preferably from 3 to 16 carbon atoms).

Based on the reasons as described above, the case is more preferable, in which $R^6$ and $R^7$ each represent a straight-chain or branched alkyl group having from 6 to 30 carbon atoms (more preferably from 6 to 16 carbon atoms), $R^5$ and $R^8$ each represent an alkoxycarbonyl group having from 4 to 24 carbon atoms or a carbamoyl group having from 4 to 24 carbon atoms, and $R^4$ and $R^9$ each represent a carbamoyl group having from 4 to 24 carbon atoms.

Hereinafter, specific examples (exemplary compounds 1 to 23) of the dye represented by Formula (1) to (4) above are shown below. However, it should be construed that the invention is not limited thereto. Note that, Me, Et, i-Pr, Bu, and Ph represent methyl, ethyl, isopropyl, butyl, and phenyl, respectively.

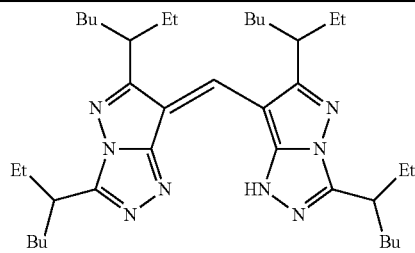

1

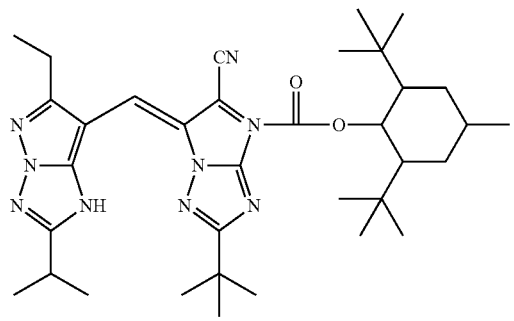

2

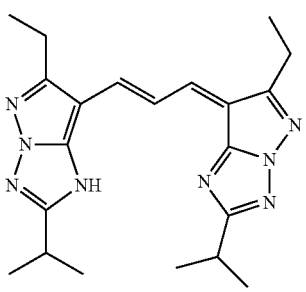 [SMILES: CCc1nn2nc(C(C)C)[nH]c2c1/C=C/C=c1/c(CC)nn2nc(C(C)C)nc12]

3

-continued
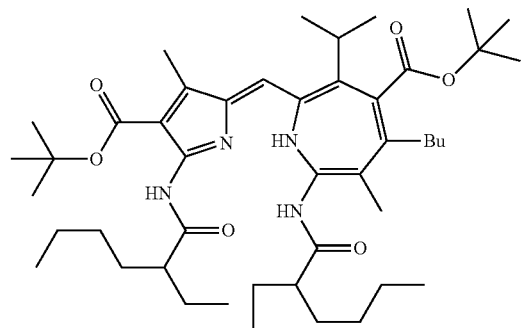
4
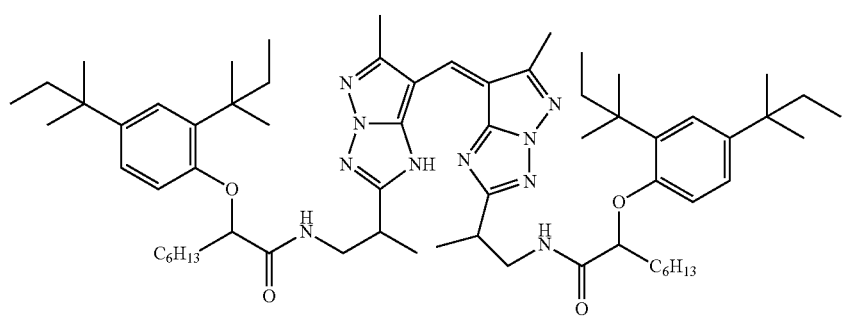
5
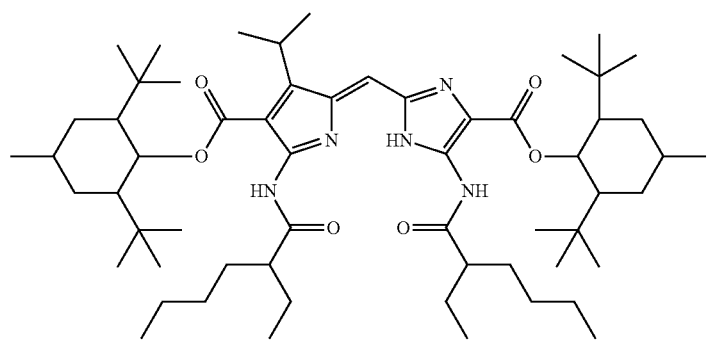
6
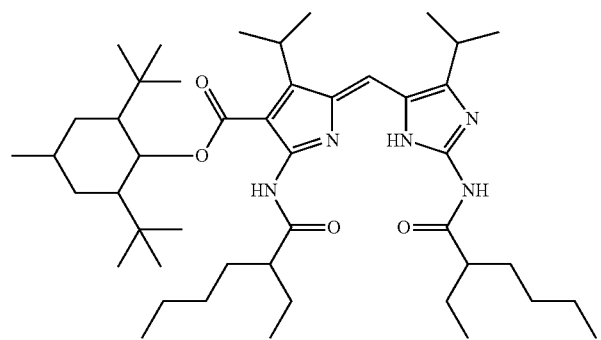 [SMILES: CCCCC(CC)C(=O)NC1=N/C(=C\c2[nH]c(NC(=O)C(CC)CCCC)nc2C(C)C)C(C(C)C)=C1C(=O)OC1C(C(C)(C)C)CC(C)CC1C(C)(C)C]
7

-continued
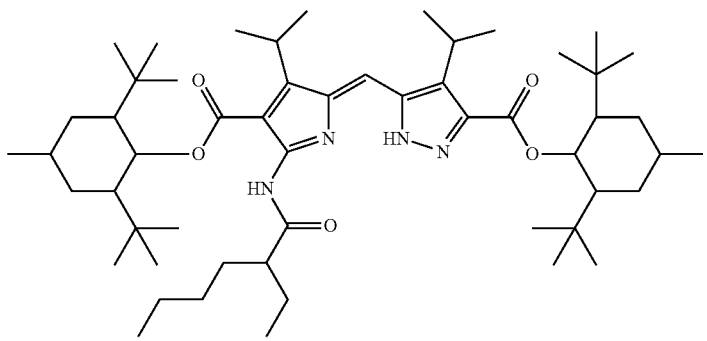
8
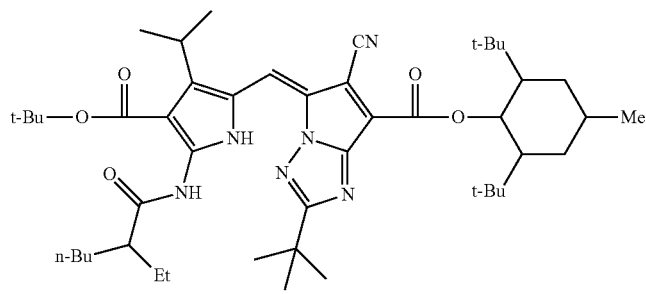
9
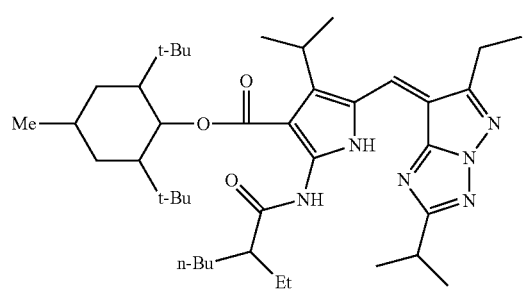
10
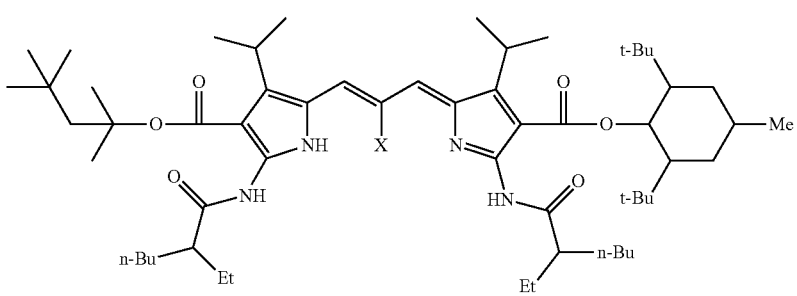
11, 12
X = H (11)
X = Me (12)
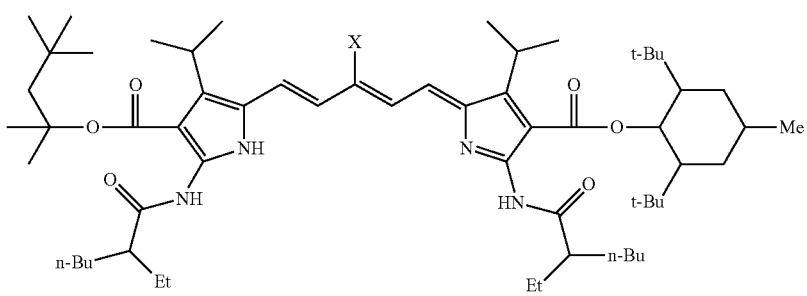
13, 14
X = H (13)
X = Me (14)

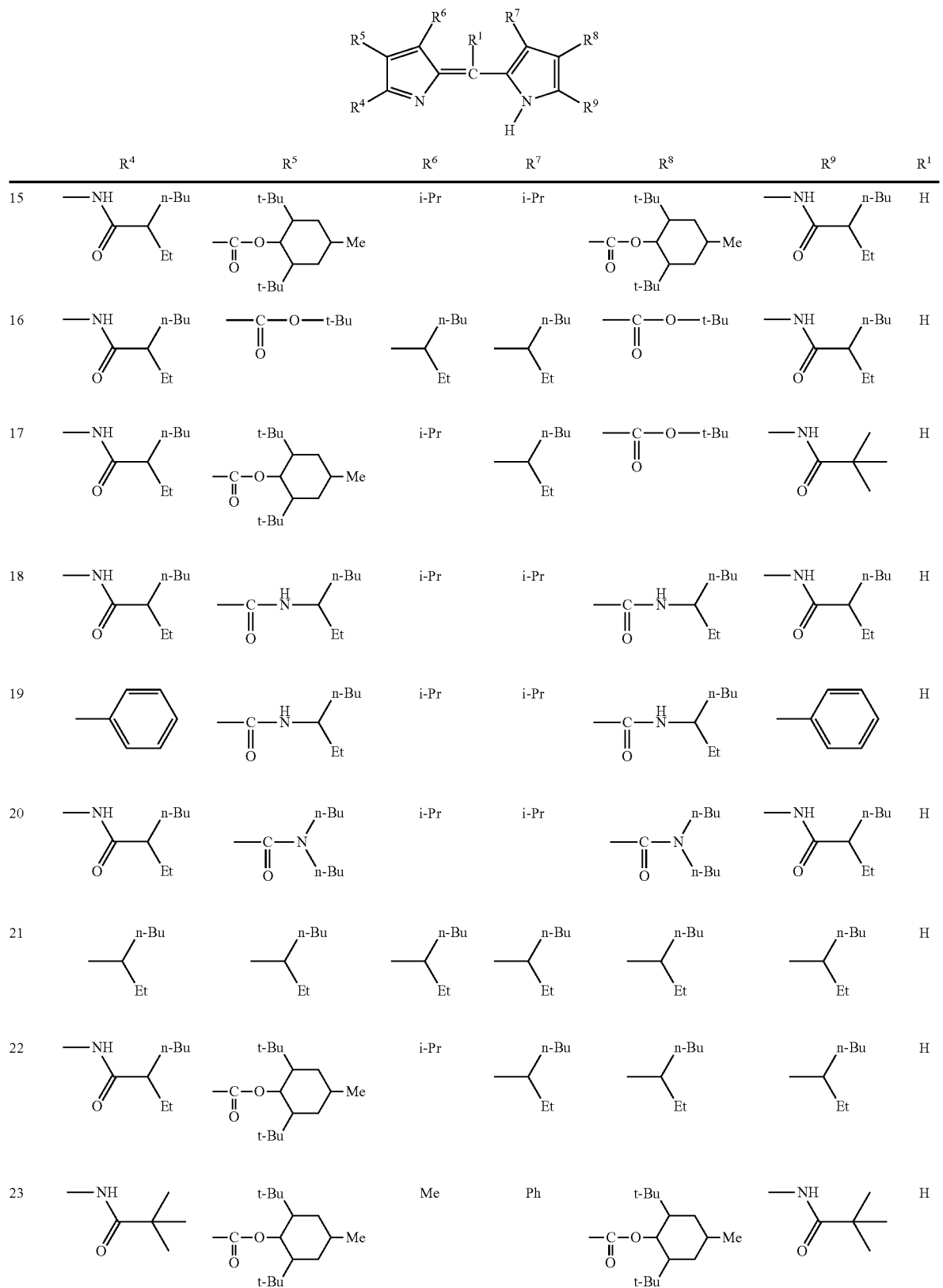

—Various Additives—

The oil may contain, as other components, various additives such as a surfactant, an ultraviolet absorbent, or an antioxidant, as necessary. In the case of containing an additive, the content of the additive is not particularly limited, but generally, the additive is used in an amount of about 20% by mass or less with respect to the total mass of the oil.

The oil may be prepared as a black ink or the like, using one kind of a dye alone, or may be prepared as a black ink or the like, using plural dyes as a mixture.

In the case of using plural dyes in combination, it is preferable to use a yellow dye having an absorption wavelength in a range of from 400 nm to 500 nm, a magenta dye having an absorption wavelength in a range of from 500 nm to 600 nm, and a cyan dye having an absorption wavelength in a range of from 600 nm to 700 nm in combination.

The term "black" refers to the property in which, among the transmission factors at 450 nm, 500 nm, 550 nm, and 600 nm, respectively, the difference between the maximum transmission factor and the minimum transmission factor is 20% or less, and the difference is preferably 15% or less and particularly preferably 10% or less.

The hydrophilic liquid 14 is a conductive, hydrophilic liquid. The term "conductive" refers to the property of the specific resistance of $10^5$ Ω·cm or less (preferably $10^4$ Ω·cm or less).

The hydrophilic liquid is configured to include, for example, an electrolyte and an aqueous solvent.

Examples of the electrolyte include salts such as sodium chloride, potassium chloride, tetrabutylammonium chloride, or the like. The concentration of the electrolyte in the hydrophilic liquid is preferably from 0.1 mol/L to 10 mol/L, and more preferably from 0.1 mol/L to 5 mol/L.

As the aqueous solvent, water and alcohol are preferable. The aqueous solvent may further include an aqueous solvent other than water. Examples of the alcohol include ethanol, ethylene glycol, and glycerin.

From the viewpoint of responsiveness, it is preferable that the aqueous solvent does not contain a surfactant.

In the electrowetting display device 100, electric power supply 25 (a voltage application means) for applying a voltage between the conductive film 11b and the conductive film 12b through the hydrophilic liquid 14, and switch 26 for turning on/off this voltage are electrically connected.

In the present exemplary embodiment, application of a voltage (potential) to the hydrophilic liquid 14 can be carried out by applying a voltage to the conductive film 12b provided on the substrate 12. As described above, in the present exemplary embodiment, a surface of the substrate 12, the surface being on the side that contacts with the hydrophilic liquid 14, has conductivity (for example, an ITO film as a conductive film exists on a side of the base material 12a, the side contacting with the hydrophilic liquid 14), but the invention is not limited to this form. For example, the application of a voltage (potential) to the hydrophilic liquid 14 may be carried out by using an electrode which is inserted in the hydrophilic liquid 14, without providing conductive film 12b on the substrate 12.

Next, the actions (the voltage off state and the voltage on state) of the electrowetting display device 100 are described.

As shown in FIG. 1, in the voltage off state, since the affinity between the hydrophobic insulating film 20 and the oil 16 is high, the oil 16 is in a state of being in contact with the entire surface of the hydrophobic insulating film 20. When the switch 26 of the electrowetting display device 100 is turned on to perform application of a voltage, the interface between the hydrophilic liquid 14 and the oil 16 transforms from the interface 17A of FIG. 1 to the interface 17B of FIG. 2. In this process, the contact area between the hydrophobic insulating film 20 and the oil 16 is reduced and, as shown in FIG. 2, the oil 16 moves to the edge of the cell. This phenomenon is a phenomenon which is caused when a charge is generated at the surface of the hydrophobic insulating film 20 by the application of a voltage, and due to this charge, the hydrophilic liquid 14 pushes the oil 16, that has been in contact with the hydrophobic insulating film 20 and, as a result, the hydrophilic liquid 14 is brought into contact with the hydrophobic insulating film 20.

When the switch 26 of the electrowetting display device 100 is turned off to be in the voltage off state, the oil returns again to be in the state of FIG. 1.

In the electrowetting display device 100, the actions shown in FIG. 1 and FIG. 2 are performed, repeatedly.

In the above description, an exemplary embodiment of the electrowetting display device is explained with reference to FIG. 1 and FIG. 2; however, the present invention is not limited to the present exemplary embodiment.

For example, in FIG. 1 and FIG. 2, the conductive film 11b is provided over the entire surface of the base material 11a in the substrate 11; however, a form in which the conductive film 11b is provided only on a portion of the surface of the base material 11a may also be employed. Further, in the substrate 12, the conductive film 12b is provided over the entire surface of the base material 12a; however, a form in which the conductive film 12b is provided only on a portion of the surface of the base material 12a may also be employed.

Further, in an exemplary embodiment, by adding one or more dyes to the oil 16, to color the oil to have a desired color (for example, black, red, green, blue, cyan, magenta, yellow, or the like), the oil can function as a pixel of an electrowetting display device which performs image display. In this case, the oil 16 functions, for example, as an optical shutter that changes the on state and off state of the pixel. In this case, the electrowetting display device may be of any system of a transmission type, a reflection type, or a semi-transmission type.

Further, the electrowetting display device in the present exemplary embodiment may have an ultraviolet ray cut-off layer on the outer side (the side opposite to the surface that faces the oil) of at least one of the first substrate or the second substrate. Thereby, the lightfastness of the display device can be further improved.

As the ultraviolet ray cut-off layer, a known substance can be used and, for example, an ultraviolet ray cut-off layer (for example, an ultraviolet ray cut-off film) containing an ultraviolet absorbent can be used. It is preferable that the ultraviolet ray cut-off layer absorbs 90% or more of light having a wavelength of 380 nm.

The ultraviolet ray cut-off layer can be provided at the outer side of at least one of the first substrate or the second substrate by a known method such as pasting using an adhesive or the like.

In the electrowetting display device, by considering the structure shown in FIG. 1 (a region (display cell) obtained by dividing the region between the hydrophobic insulating film 20 and the substrate 12 with the silicone rubber wall 22a and the silicone rubber wall 22b, for example, in a lattice-like shape) as one pixel of a display member, and by two-dimensionally arranging two or more of the above display cells, it becomes possible to display an image. In this process, the conductive film 11b may be a film which is patterned independently for every one pixel (display cell) (for example, in the case of an active matrix type image display device and the like), or may be a film which is patterned in a striped shape lying across plural pixels (display cells) (for example, in the case of a passive matrix type image display device and the like).

In the electrowetting display device 100, by using, as the base material 11a and the base material 12a, a substrate having light transmitting property such as glass or plastic (polyethylene terephthalate, polyethylene naphthalate, or the like), and also using a film having light transmitting property as the conductive films 11b and 12b and the hydrophobic insulating film 20, a transmission type display device can be prepared. In the pixel of this transmission type display device, by providing a reflective plate at the outside of the display cell, a reflection type display device can also be prepared.

Further, by using, as the conductive film 11b, a film having an additional function as a reflective plate (for example, a metal film such as an Al film or an Al alloy film), or using, as the base material 11a, a substrate having an additional function as a reflective plate (for example, a metal substrate such as an Al substrate or an Al alloy substrate), a pixel of a reflection type image display device can also be prepared.

The other configuration of the display cell that constitutes the electrowetting display device 100 of the present exemplary embodiment or the image display device may be a known configuration described in, for example, JP-A No. 10-39800, Japanese National Phase Publication No. 2005-517993, JP-A Nos. 2004-252444 and 2004-287008, Japanese National Phase Publication Nos. 2005-506778 and 2007-531917, JP-A No. 2009-86668, and the like. Further, the configuration of a known active matrix type or passive matrix type liquid crystal display device can also be referred to.

The electrowetting display device may be constituted, as necessary, by using the same member as the member of a known liquid crystal display device, such as a back light, a spacer for adjusting the cell gap, or a sealant for sealing, in addition to the display pixel (display cell).

In this process, for example, the oil and the hydrophilic liquid may be applied to the region divided by the partition on the first substrate in accordance with an inkjet method.

Concerning a method of producing the electrowetting display device 100 of the present exemplary embodiment, for example, a method may be described, which includes a substrate preparing process of preparing the substrate 11; a process of forming the hydrophobic insulating film 20 on the side of the conductive surface of the substrate 11; a partition forming process of forming a partition that divides the face formed with the hydrophobic insulating film 20 of the substrate 11; an application process of applying (for example, by an inkjet method) the oil 16 and the hydrophilic liquid 14 to the region divided by the partition; and a cell forming process of placing the substrate 12 on a side of the substrate 11 after the application process, the side having been applied with the oil 16 and the hydrophilic liquid 14, to form a cell (display member); and, as needs arise, a sealing process of sealing the cell by adhering the substrate 11 and the substrate 12 at the circumference of the cell.

The adhesion of the substrate 11 and the substrate 12 can be conducted by using a sealant which is generally used in the preparation of liquid crystal display devices.

Further, a spacer forming process of forming a spacer for adjusting the cell gap may be provided, after the partition forming process but before the cell forming process.

EXAMPLES

Hereinafter, the present invention is specifically described with reference to Examples; however, the invention is by no means limited to the following Examples unless they are beyond the spirit of the invention.

Example 1

—1. Preparation of Colored Solution—

A methine dye (the above-described exemplary compounds 5, 15, and 23 shown in Table 1 below were prepared) and normal decane (n-decane) which is an organic solvent were mixed. In this way, three kinds of 0.01% by mass normal decane solutions (colored compositions) each colored with a methine dye were prepared.

With regard to each of the colored solutions thus prepared, the hue, absorption maximum wavelength ($\lambda_{max}$), absorbance (abs), and absorption coefficient ($\in$) were measured and evaluated according to the methods described below. Further, with regard to each of the dyes described below, the solubility (% by mass) with respect to normal hexane (n-hexane) was measured and evaluated according to the method described below. The measurement results and evaluation results are shown in Table 1 below.

—2. Measurement and Evaluation—

(1) Hue Each of the colored solutions (colored compositions) was visually observed, and the hue thereof was judged.

(2) Absorption Maximum Wavelength, Absorbance, and Absorption Coefficient

With regard to the colored solutions (colored compositions), the absorption maximum wavelength ($\lambda_{max}$) and the absorbance were measured using a visible absorptiometer (trade name: UV-1800PC, manufactured by Shimadzu Corp.), and the absorption coefficient ($\in$) was calculated based on the Lambert-Beer law.

(3) Solubility with Respect to Hexane

The solubility of each methine dye with respect to normal hexane (n-hexane) which is a nonpolar solvent was measured in a manner as described below.

The dye was dissolved in normal hexane heated to 50° C. to prepare a saturated solution. Thereafter, the saturated solution thus obtained was left for one hour under an environment of 25° C. and 0.1 MPa. The precipitated dye was filtrated and the amount of precipitation was measured, and thus, the solubility (% by mass) of the dye with respect to normal hexane at 25° C. and 0.1 MPa was calculated.

TABLE 1

| Dye | Color of solution | Absorbance (abs) | Absorption coefficient ($\in$) | Absorption maximum wavelength ($\lambda_{max}$) | Solubility in hexane (%) | Remarks |
|---|---|---|---|---|---|---|
| Exemplary compound 15 | orange | 0650 | $4.80 \times 10^4$ | 509 nm | 40 or more | Present Invention |
| Exemplary compound 23 | orange | 0645 | $4.90 \times 10^4$ | 503 nm | 10 | Present Invention |
| Exemplary compound 5 | yellow | 0.525 | $3.20 \times 10^4$ | 441 nm | 40 or more | Present Invention |

As shown in Table 1 above, the exemplary compounds 5, 15, and 23 (methine dyes) exhibited high solubility with respect to hexane which is a hydrocarbon solvent. Therefore, dye inks in which the exemplary compounds 5, 15, or 23 was satisfactorily dissolved in decane were obtained. Accordingly, the exemplary compounds 5, 15, and 23 were suitable for the production of a display member that acts according to the theory of the electrowetting method.

Example 2

—Preparation of Dye Ink—

To a normal decane solution, which was obtained by bubbling argon gas into normal decane (n-decane) such that the content of dissolved oxygen was 10 ppm or less, the exemplary compounds 5, 15, or 23 was added such that the dye concentration was 40% by mass or 10% by mass, as shown in Table 2 and Table 3 below. In this way, the dye inks used as oils were prepared.

—Preparation of Test Cell—

On a surface of the ITO film of a glass substrate (10 mm×10 mm) equipped with an indium tin oxide (ITO) film with a thickness of 100 nm as a transparent electrode, a fluorine-containing polymer (trade name: CYTOP, manufactured by Asahi Glass Co., Ltd., model number: CTL-809M) was coated such that the thickness was 600 nm, thereby forming a fluorine-containing polymer layer as a hydrophobic insulating film. Subsequently, on this fluorine-containing polymer layer, a frame-shaped silicone rubber wall which had been prepared by cutting out a tetrahedron having a size of 8 mm×8 mm×50 μm from the middle of a silicone rubber having a size of 1 cm×1 cm (a sealant having a thickness of 50 μm; SILI-US (trade name), manufactured by Fuso Rubber Co., Ltd.) was placed to form a display member. Into the region enclosed by this silicone rubber wall, the dye ink obtained as described above was injected such that the thickness became 4 μm. On the dye ink that had been injected, ethylene glycol was injected such that the thickness became 46 μm. On this assembly, a glass substrate equipped with an ITO film was further placed such that the ITO film faced the dye ink or the electrolyte aqueous solution, and was fixed. In this way, an electrowetting test cell having a structure shown in FIG. 1 was prepared.

—Evaluation—

To each of the ITO films (transparent electrodes) of the two glass substrates each equipped with an ITO film, a DC voltage of 100 V was applied (a minus voltage was applied to the ITO electrode on the side having thereon the fluorine-containing polymer (hydrophobic insulating film)) by using a signal generator, and the display cell (display cell 30 in FIG. 2) was observed. As a result, it was confirmed that the dye ink had moved toward one direction on the surface of the fluorine-containing polymer layer, and the area of the dye ink covering the fluorine-containing polymer layer was reduced. The responsiveness of the dye ink in this process, and the degree of the back flow phenomenon, when kept in the voltage on state as it was, were evaluated.

The reduction of the area by application of a voltage was evaluated based on the area shrinkage factor [%] calculated according to the following Equation (1), and the back flow phenomenon was evaluated based on the back flow ratio [%] calculated according to the following Equation (2).

a) Response time [msec]=Time needed to reach the most shrink state from the initiation of application, when the application of a voltage is initiated from the voltage non-applying state b) Area shrinkage factor [%]=(Area of the dye ink when the dye ink shrinks at the most)/(Area of the dye ink before application of voltage)×100    Equation (1)

c) Back flow ratio [%]=(Area of the dye ink after 5 seconds have past in the voltage on state)/(Area of the dye ink when the dye ink shrinks at the most)×100    Equation (2)

Further, regarding the OD (image density), the OD value at the maximum absorption wavelength of the dye was measured using a spectroradiometer (trade name: SR-3, manufactured by TOPCON CORPORATION) and was evaluated. The OD value is a value per 1 μm-thickness of the oil layer.

TABLE 2

[Dye density: 40% by mass]

| | Dye | Responsibility | | Back flow ratio [%] | OD | Remarks |
| | | Area shrinkage factor [%] | Response time [mSec] | | | |
|---|---|---|---|---|---|---|
| 1 | Ex. comp. 15 (M.W: 1016) | 25 | <200 | 110 | 2.6 | Present Invention |
| 2 | Ex. comp. 5 (M.W: 1086) | 28 | 200~1000 | 110 | 2.1 | Present Invention |

In table 2, an abbreviation of "Ex. comp." denotes "Exemplary compound number". When Area shrinkage is 100%, it is meant that the area is not shrunk.

TABLE 3

[Dye density: 10% by mass]

| | Dye | Responsibility | | Back flow ratio [%] | OD | Remarks |
| | | Area shrinkage factor [%] | Response time [mSec] | | | |
|---|---|---|---|---|---|---|
| 1 | Ex. comp. 15 (M.W: 1016) | 18 | <200 | 110 | 0.65 | Present Invention |
| 2 | Ex. comp. 23 (M.W: 937) | 18 | <200 | 110 | 0.65 | Present Invention |
| 3 | Ex. comp. 5 (M.W: 1086) | 20 | <200 | 120 | 0.53 | Present Invention |

In table 3, an abbreviation of "Ex. comp." denotes "Exemplary compound number". When Area shrinkage is 100%, it is meant that the area is not shrunk.

As shown in Table 2 and Table 3 above, although a difference in the degree of effects, which may be demonstrated due to the dye concentration, was seen, the display devices using the dye according to the present invention exhibited good responsiveness, and moreover, the back flow phenomenon after the image display (in the voltage on state) was suppressed.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An electrowetting display device comprising a display member comprising:
a first substrate in which at least a portion of at least one surface has conductivity,
a second substrate which is disposed to face the conductive surface of the first substrate,
a hydrophobic insulating film which is provided on at least a portion of the conductive surface of the first substrate,
an oil, which is non-conductive, provided between the hydrophobic insulating film and the second substrate so as to be movable on the hydrophobic insulating film, and containing a nonpolar solvent and a methine dye including two dye mother nuclei that are linked through a linking group having a methine unsaturated chain, and
a hydrophilic liquid, which is conductive, provided between the hydrophobic insulating film and the second substrate so as to be in contact with the oil;
wherein an image is displayed by changing the shape of the interface between the oil and the hydrophilic liquid by applying a voltage between the hydrophilic liquid and the conductive surface of the first substrate, and wherein the methine dye is represented by the following Formula (2):

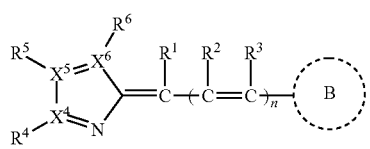

Formula (2)

wherein, in Formula (2), each of $R^1$, $R^2$, and $R^3$ independently represents a hydrogen atom, a halogen atom, an alkyl group, an aryl group or a heterocyclic group; each of $R^4$, $R^5$ and $R^6$ independently represents a hydrogen atom or a monovalent substituent; each of $X^4$, $X^5$, and $X^6$ independently represents a carbon atom or a nitrogen atom; when $X^4$, $X^5$ or $X^6$ represents a nitrogen atom, $R^4$, $R^5$ or $R^6$ respectively linked to $X^4$, $X^5$ or $X^6$ which represents a nitrogen atom, is not present; B represents a dye mother nucleus without a dissociative group; and n represents an integer of 0, 1 or 2.

2. The electrowetting display device according to claim 1, wherein the methine dye does not include a metal atom or metallic compound for forming a complex.

3. The electrowetting display device according to claim 1, wherein solubility of the methine dye in n-hexane under a pressure of 0.1 MPa at a temperature of 25° C. is 1% by mass or greater.

4. The electrowetting display device according to claim 1, wherein the methine dye is represented by the following Formula (3):

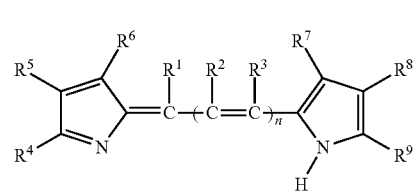

Formula (3)

wherein, in Formula (3), each of $R^1$, $R^2$, and $R^3$ independently represents a hydrogen atom, a halogen atom, an alkyl group, an aryl group or a heterocyclic group; each of $R^4$, $R^5$, $R^6$, $R^7$, $R^8$ and $R^9$ independently represents a hydrogen atom or a monovalent substituent; and n represents an integer of 0, 1 or 2.

5. The electrowetting display device according to claim 1, wherein the methine dye is represented by the following Formula (4):

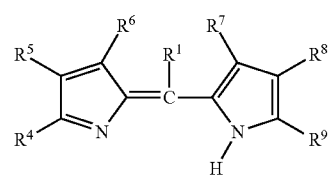

Formula (4)

wherein, in Formula (4), $R^1$ represents a hydrogen atom, a halogen atom, an alkyl group, an aryl group or a heterocyclic group; and each of $R^4$, $R^5$, $R^6$, $R^7$, $R^8$ and $R^9$ independently represents a hydrogen atom or a monovalent substituent.

6. The electrowetting display device according to claim 1, wherein the methine dye comprises a straight chain or branched alkyl group having 4 to 30 carbon atoms.

7. The electrowetting display device according to claim 1, wherein a molecular weight of the methine dye is from 200 to less than 3000.

8. The electrowetting display device according to claim 1, wherein a total amount of dyes contained in the oil is 20% by mass or more with respect to a total mass of the oil, and a ratio of the methine dye in the oil is 5% by mass or more with respect to a total mass of the oil.

9. The electrowetting display device according to claim 1, wherein an amount of dissolved oxygen in the non-polar solvent is 10 ppm or less.

10. The electrowetting display device according to claim 1, wherein the hydrophobic insulating film comprises a crosslinked structure derived from a polyfunctional compound.

11. A dye composition for an electrowetting display, the dye composition comprising a non-polar solvent and a methine dye that contains two dye mother nuclei linked through a linking group having a methine unsaturated chain, wherein the methine dye is represented by the following Formula (2):

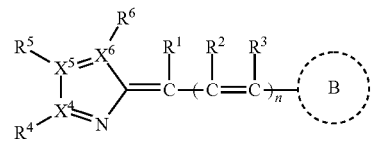

Formula (2)

wherein, in Formula (2), each of $R^1$, $R^2$, and $R^3$ independently represents a hydrogen atom, a halogen atom, an alkyl group, an aryl group or a heterocyclic group;

each of $R^4$, $R^5$ and $R^6$ independently represents a hydrogen atom or a monovalent substituent each of $X^4$, $X^5$, and $X^6$ independently represents a carbon atom or a nitrogen atom; when $X^4$, $X^5$ or $X^6$ represents a nitrogen atom, $R^4$, $R^5$ or $R^6$ respectively linked to $X^4$, $X^5$ or $X^6$ which represents a nitrogen atom, is not present B represents a dye mother nucleus without a dissociative group; and n represents an integer of 0, 1 or 2.

12. The dye composition for an electrowetting display according to claim 11, wherein the methine dye comprises a straight chain or branched alkyl group having 4 to 30 carbon atoms.

13. The dye composition for an electrowetting display according to claim 11, wherein a total amount of dyes contained in the solvent is 20% by mass or more with respect to a total mass of the solvent, and a ratio of the methine dye in the solvent is 5% by mass or more with respect to a total mass of the solvent.

* * * * *